(12) United States Patent
Lane et al.

(10) Patent No.: US 9,067,097 B2
(45) Date of Patent: Jun. 30, 2015

(54) VIRTUAL LOCOMOTION CONTROLLER APPARATUS AND METHODS

(75) Inventors: Stephen H. Lane, Princeton, NJ (US);
Joseph Schnurr, New Haven, CT (US);
Hemanth K. Satyanarayana, Sri Kalahasthi (IN); Liming Zhao, Jersey City, NJ (US)

(73) Assignee: soVoz, Inc., Princeton, NJ (US)

( * ) Notice: Subject to any disclaimer, the term of this patent is extended or adjusted under 35 U.S.C. 154(b) by 630 days.

(21) Appl. No.: 12/757,792

(22) Filed: Apr. 9, 2010

(65) Prior Publication Data

US 2011/0009241 A1 Jan. 13, 2011

Related U.S. Application Data

(60) Provisional application No. 61/212,415, filed on Apr. 10, 2009.

(51) Int. Cl.

| | |
|---|---|
| A63B 71/00 | (2006.01) |
| G06T 13/00 | (2011.01) |
| A63B 24/00 | (2006.01) |
| A63B 71/06 | (2006.01) |
| G06F 3/01 | (2006.01) |
| G06K 9/00 | (2006.01) |
| A63B 22/02 | (2006.01) |

(52) U.S. Cl.
CPC ............. *A63B 24/0087* (2013.01); *A63B 22/02* (2013.01); *A63B 71/0622* (2013.01); *A63B 2024/0071* (2013.01); *A63B 2024/0096* (2013.01); *A63B 2071/0636* (2013.01); *A63B 2071/0661* (2013.01); *A63B 2220/13* (2013.01); *A63B 2220/16* (2013.01); *A63B 2220/40* (2013.01); *A63B 2220/51* (2013.01); *A63B 2220/56* (2013.01); *A63B 2220/803* (2013.01); *A63B 2225/50* (2013.01); *G06F 3/011* (2013.01); *G06K 9/00342* (2013.01)

(58) Field of Classification Search
USPC .......................................................... 482/8, 1
See application file for complete search history.

(56) References Cited

U.S. PATENT DOCUMENTS

| | | | |
|---|---|---|---|
| 5,362,069 | A | 11/1994 | Hall-Tipping |
| 5,524,637 | A | 6/1996 | Erickson |
| 5,563,988 | A | 10/1996 | Maes |
| 5,592,401 | A | 1/1997 | Kramer |

(Continued)

OTHER PUBLICATIONS

Lane, S.H., Marshall, H. and Roberts, T., "Control Interface for Driving Interactive Characters in Immersive Virtual Environments," Proceedings of the 2006 Army Science Conference, Orlando, FL, Nov. 2006.

(Continued)

*Primary Examiner* — Loan H Thanh
*Assistant Examiner* — Shila Jalalzadeh Abyan
(74) *Attorney, Agent, or Firm* — Volpe and Koenig, P.C.

(57) ABSTRACT

Apparatus and methods are disclosed for a virtual locomotion controller user interface and system that combines data obtained from various sensor devices to allow users to control the movements of their representation in a virtual world using sensorimotor responses closely resembling the tasks and actions they would physically perform in the real world. As a result, users can specify an avatar's locomotion style by assuming body postures normally associated with that type of movement, while controlling locomotion speed or displacement through foot forces and/or stepping motions and locomotion direction through foot and body orientation.

31 Claims, 22 Drawing Sheets

(56) References Cited

U.S. PATENT DOCUMENTS

| | | |
|---|---|---|
| 5,819,206 A | 10/1998 | Horton et al. |
| 5,899,963 A | 5/1999 | Hutchings |
| 5,930,741 A | 7/1999 | Kramer |
| 6,195,921 B1 | 3/2001 | Truong |
| 6,646,643 B2 | 11/2003 | Templeman |
| 6,757,068 B2 | 6/2004 | Foxlin |
| 6,826,477 B2 | 11/2004 | Ladetto et al. |
| 6,902,513 B1 | 6/2005 | McClure |
| 7,520,836 B2 | 4/2009 | Couvillion, Jr. et al. |
| 7,542,040 B2 | 6/2009 | Templeman |
| 7,588,516 B2 | 9/2009 | Couvillion, Jr. et al. |
| 2006/0262120 A1* | 11/2006 | Rosenberg .................... 345/473 |
| 2007/0003915 A1* | 1/2007 | Templeman .................. 434/247 |
| 2007/0203665 A1* | 8/2007 | Darley et al. ................. 702/142 |

OTHER PUBLICATIONS

Yan, L., Allison, R. S., and Rushton, S. K. "New simple virtual walking method—walking on the spot." In 8th Annual Immersive Projection Technology Symposium (2004).

Templeman, J. N., Denbrook, P. S., and Sibert, L. E. "Virtual locomotion: Walking in place through virtual environments." Presence: Teleoperators & Virtual Environments 8, 6 (1999), 598-617.

* cited by examiner

| Detector | Fig. 9 Block | Trigger Condition |
|---|---|---|
| Step Detector (Detailed in Fig 17) | 922 | Lift->Move->Plant->Lift sequence on primary foot AND Minimal motion on secondary foot AND Primary foot plant time < Drive time threshold |
| Gait Detector (Detailed in Figs 19,20,21) | 924 | Three lifts detected in place on alternating feet OR Both feet off ground with minimal separation and not Jump OR Step detected then Lift->Plant sequence in place on other foot within time window |
| Crawl Detector | 926 | Pitch angle values for waist and feet > Crawl thresholds |
| Drive Detector (Detailed in Fig 18) | 928 | Lift->Move->Plant sequence on primary foot with foot separation > Drive sep thresh AND Primary foot must be in front AND Both feet planted for duration > Drive time threshold |
| Jump Detector | 930 | Lift detected on both feet within predefined timespan |
| Step Exit Detector | 912 | Exit immediately after step detected (Note: On exiting Step Mode the detected step is loaded into the Gait Detector for use in its Trigger Condition Logic) |
| Gait Exit Detector | 952 | Both feet on ground for duration > Giat threshold (where threshold is based on latest Gait characteristics) |
| Gait To Drive Detector | 954 | Exit Gait Detector Condition AND Separation > Drive sep thresh |
| Gait To Step Detector | 956 | Lift->Move->Plant->Lift AND Move Dist > Gait Thresh |
| Gait To Jump Detector | 958 | Same as Jump Detector |
| Crawl Exit Detector | 942 | Pitch angle values for waist and feet < Crawl thresholds |
| Drive Exit Detector | 962 | Both feet are planted with separation < Drive sep threshold (Note: On exiting Drive Mode a forward step is loaded into the Gait Detector for use in its Trigger Condition Logic) |
| Pivot Detector | 964 | Primary Foot Lifted |
| Jump Exit Detector | 902 | Plant detected on one or both feet AND Stance was last mode |
| Jump To Gait Detector | 904 | Plant detected on one or both feet AND Gait was last mode |
| Pivot Exit Detector | 972 | Both feet are planted with separation < Drive Sep Threshold |
| Pivot To Drive Detector | 974 | Primary Foot Planted AND Separation > Drive Sep Thresh |

FIG. 13

```
State Vector
├── time
├── action = {leftLift, leftPlant, rightLift, rightPlant, footStill}
├── foot_separation
├── forward_foot
├── left_foot
│   ├── state = {onGround, offGround}
│   ├── position
│   └── orientation
└── right_foot
    ├── state = {onGround, offGround}
    ├── position
    └── orientation
```

FIG. 14

```
Feature
├── time
├── action = {priLift, priPlant, secLift, secPlant, footStill}
├── foot_separation
├── forward_foot
├── pri_foot
│   ├── state = {onGround, offGround}
│   ├── position
│   └── orientation
└── sec_foot
    ├── state = {onGround, offGround}
    ├── position
    └── orientation
```

FIG. 15

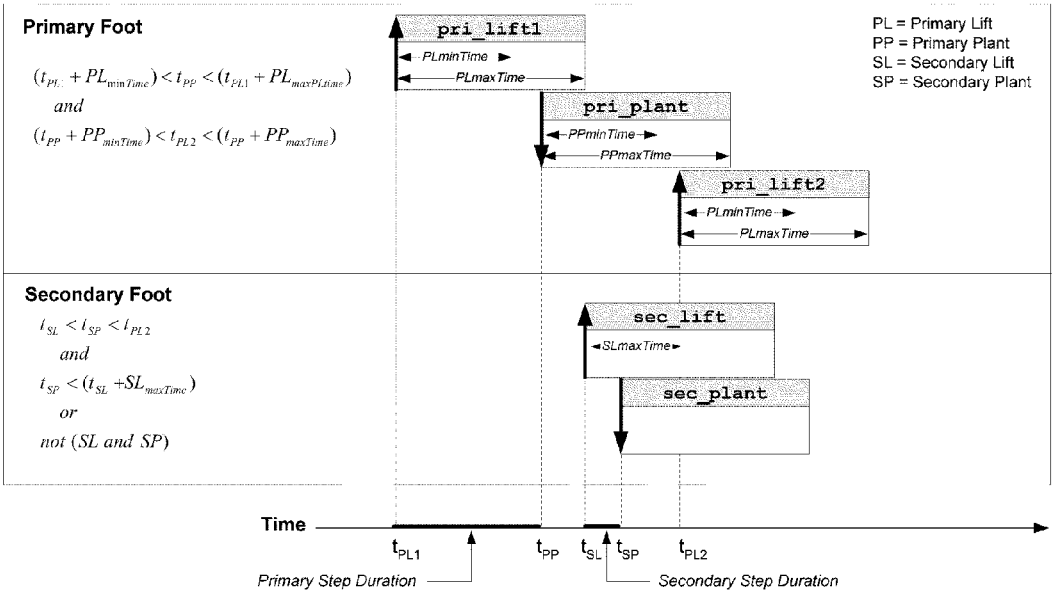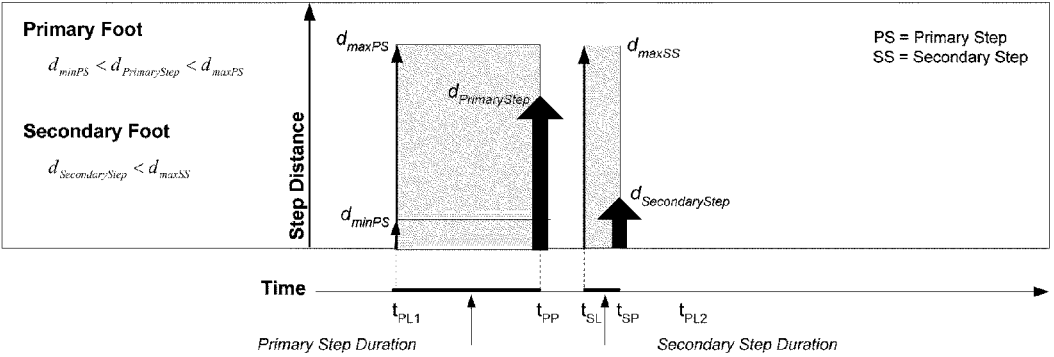
FIG. 17

AUTO DRIVE DETECTOR EVENTS AND CONDITIONS
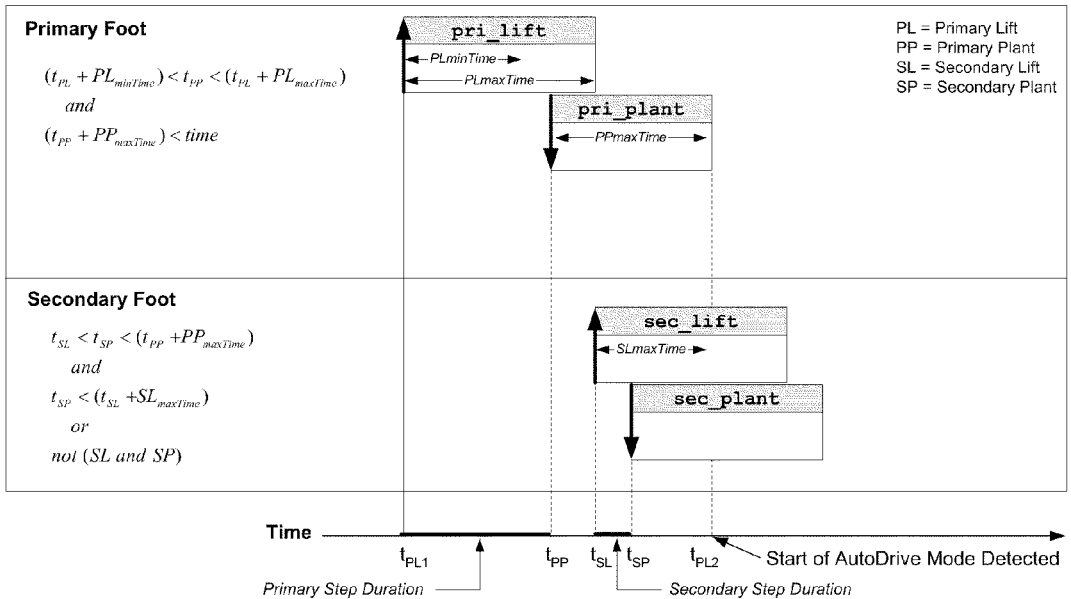
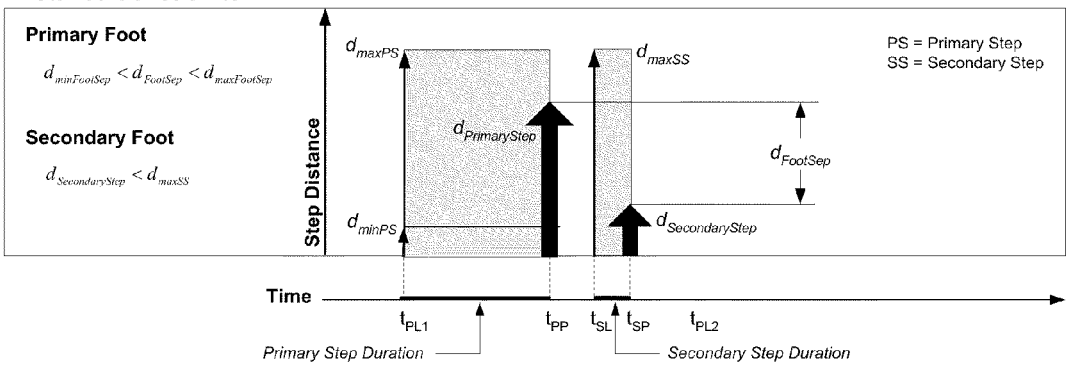
FIG. 18

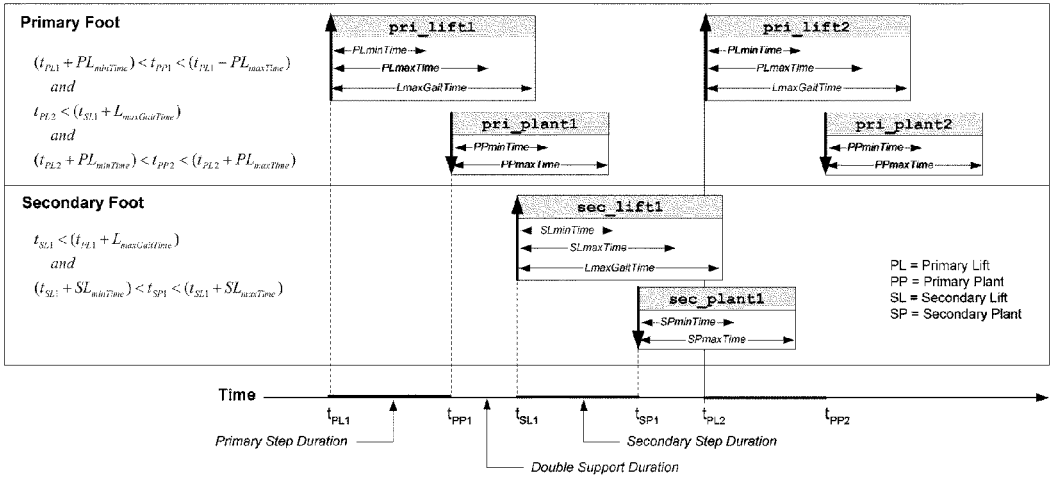
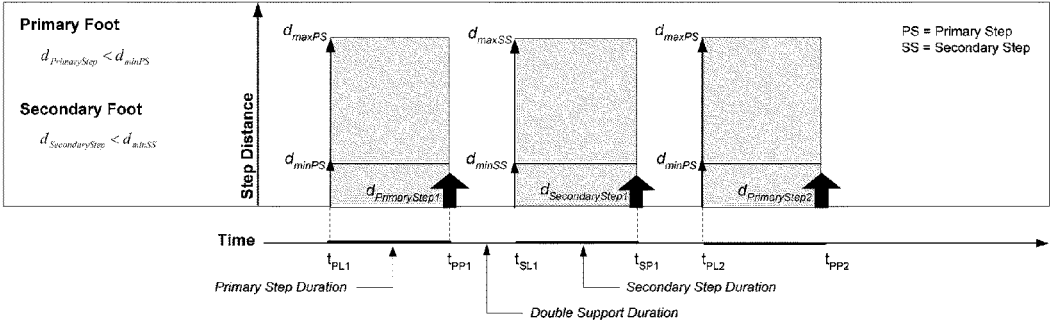
FIG. 19

GAIT DETECTOR EVENTS AND CONDITIONS
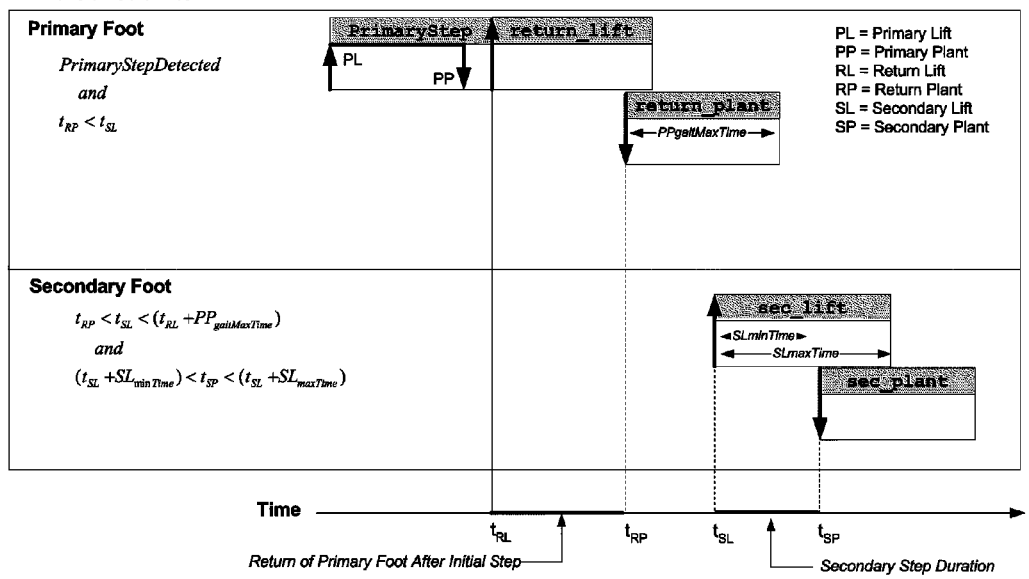
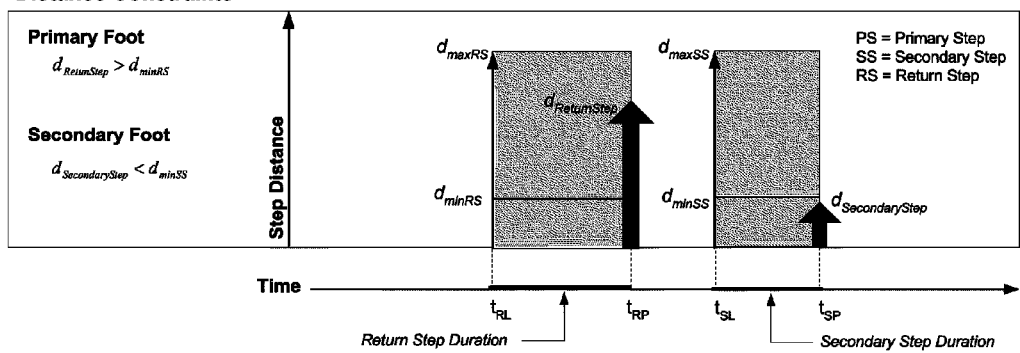
FIG. 21

VIRTUAL LOCOMOTION CONTROLLER APPARATUS AND METHODS

CROSS-REFERENCE TO RELATED APPLICATION

This application claims the benefit of U.S. Provisional Application No. 61/212,415 filed Apr. 10, 2009, which is incorporated by reference as if fully set forth herein.

FIELD OF INVENTION

The embodiments of the present invention described herein relate to man/machine user interfaces for controlling the movement and actions of animated entities in computer games, 3D simulations and immersive virtual reality applications.

BACKGROUND

Virtual reality (VR) involves computer generation of visual imagery and sounds to create the illusion that the user is spatially immersed in a fully interactive a 3D virtual world. The 3D virtual world can range from a high-fidelity physical simulation of reality to completely imaginary spaces unlike anything the user has ever seen or experienced. As a result, VR has found many applications in architecture and urban design, simulation and training, and entertainment.

There are a number of different types of VR systems. In most desktop VR systems, the user sees the virtual world through the avatar's eyes (e.g., from a first person perspective). Here, a user operates different controls on a keyboard, mouse, joystick or game controller to control different features of the avatar's movement (e.g., speed, direction, jumping, use of a weapon, etc.). However, the avatar's body usually moves in the direction the avatar is facing in the virtual world. This may be referred to as "head steering". In some systems, a user can also control the direction of the avatar's body movement independent of the view direction by pressing a particular button or key or executing a particular sequence of commands. This type of operation where control of view direction is independent of movement direction may be referred to as "strafing".

Immersive VR takes this one step further by enabling the user's point of view in the virtual world to be updated based on the user's head and/or body movements. In some less interactive systems, users may simply move a hand-held controller in different ways to cause the avatar to perform different movements. For example, in a virtual tennis game, a user may swing the controller similar to a tennis racket and the motion controls the timing and direction of the avatar's swing while the system automatically handles the locomotion movements required to hit a moving tennis ball. Other more interactive systems may track a user's head or other body motions to control more aspects of the avatar's movements in the virtual environment, such as the avatar view direction, avatar body orientation, body posture, direction of movement, distance of movement or speed of movement. Haptic feedback and hand tracking devices may also be used to enable the user to issue commands or directly manipulate objects in the 3D virtual world.

Desktop gaming systems encompass the majority of VR systems currently on the market. In desktop gaming applications, user interaction with 3D virtual worlds is often limited by computer interfaces that require the movements and actions of a player's character (or avatar) to be controlled with the hands, for example by moving a joystick or mouse and pressing buttons or keys.

Other approaches allow users to control locomotive movement of avatars in virtual environments using movements and actions more similar to what they might perform in the real world, such as stepping, walking, jogging, running, jumping, etc. These approaches can be divided into those requiring the user to interact with external apparatus and other hardware devices fixed in the environment which provide kinesthetic feedback, such as linear and omni-directional treadmills, moving floor plates and hollow spheres, and those that monitor gestural movements of the user representative of locomotive motions such as walking, running and jumping that are performed in place (e.g., without the user translating the position of their body in the real world).

One disadvantage of the kinesthetic feedback approaches that require a user to interact with treadmills, moving floor plates, hollow spheres, etc., is that the external hardware is often large, heavy, expensive and/or dangerous to use. They also suffer from the fact that momentum builds up in the device as it is operated by the user which makes it difficult for the user to stop quickly, change or reverse direction, make sudden lateral movements, take individual steps or jump (if these are even possible) without falling. The gestural approaches attempt to monitor typical user movements associated with bipedal locomotion (i.e. stepping, walking, running, jumping, etc) using a variety of types of sensors to track user motions and extract features from these motions in order to control corresponding movements of an avatar in the virtual world. Described herein are embodiments of a virtual locomotion controller user interface and system based on such an approach.

BRIEF SUMMARY OF THE INVENTION

Apparatus and methods are disclosed for a virtual locomotion controller user interface and system that may combine data obtained from various sensor devices to allow users to control the movements of their representation in a virtual world (e.g., avatar) using sensorimotor responses closely resembling the tasks and actions they would physically perform in the real world. As a result, users can specify an avatar's locomotion style by assuming body postures normally associated with that type of movement (e.g. standing, walking, running, etc.), while controlling locomotion speed through foot forces and/or stepping motions and locomotion direction through foot and body orientation.

In one embodiment, a user can control an avatar's stepping and walking motions in a virtual world by physically performing in place actions in the real world that closely resemble actual stepping or walking movements, however with no translation of the user's body. The same may be true for jogging, running, jumping and crawling, etc. As a result, in one embodiment, a user can control the direction of movement of an avatar in the virtual environment by physically orienting their feet in the desired direction in the real world. In another embodiment, a user can also control avatar body orientation independent from its direction of movement through the orientation of the user's waist in the real world.

Such a virtual locomotion controller user interface and system is potentially usable with a wide range of application software (e.g. training, education, entertainment) and hardware platforms (PCs, embedded systems and game consoles). Possible applications include: dismounted infantry immersive training systems, 3D computer games and virtual reality simulations, interactive fitness and virtual sports, physical rehabilitation and sports training applications.

BRIEF DESCRIPTION OF THE DRAWINGS

These, and other, features, aspects, and advantages of the embodiments of the present invention described below will become more fully apparent from the following detailed description, appended claims, and accompanying drawings, in which the same reference numerals are used for designating the same elements throughout the several figures, and in which:

FIG. 13 is a diagram of a control logic state machine and its transition conditions;

FIG. 14 shows a data structure containing state vector information;

FIG. 15 shows a data structure for detecting features;

FIG. 17 illustrates the time and distance events and conditions used to detect the user's steps in a step mode;

FIG. 18 illustrates the time and distance events and conditions used to detect the activation of an auto drive mode;

FIG. 19 illustrates the time and distance events and conditions used to detect the step pattern for a first scheme of gait drive mode;

FIG. 21 illustrates the time and distance events and conditions used to detect the step pattern for a third scheme of gait drive mode;

DETAILED DESCRIPTION

Figure 1:
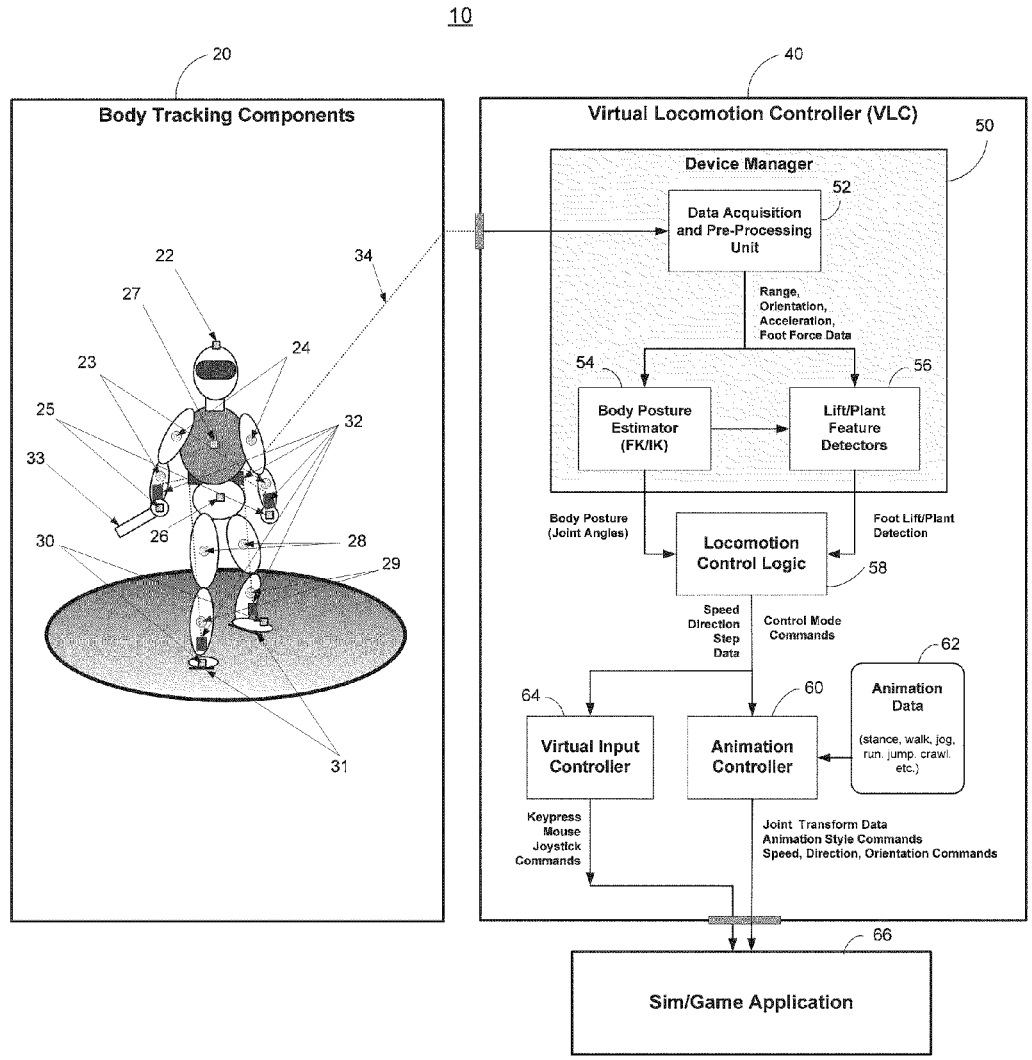
FIG. 1 is a diagram of a virtual locomotion user interface and system.

A goal of virtual reality gaming, training and simulation applications is to fully immerse the user in a computer generated world. Embodiments described herein address this goal by providing a more natural man/machine interface that allows users to control their avatar using sensorimotor responses that closely resemble the tasks and actions they would physically perform in the real world. For example, if a user is performing a task in the virtual world requiring crouching, then he or she may be crouching in the real world. If he or she is running down a hallway in the virtual world, he or she may be leaning forward and using his or her feet to command the desired speed and direction of his or her avatar's movement. Such embodiments not only increase the immersiveness and fidelity of gaming and simulation applications, but may also help maximize training effectiveness by reducing the time required to achieve the same level of proficiency in an equivalent real-world task or situation.

The embodiments of the present invention described herein may relate to man/machine user interfaces for controlling the movement and actions of animated objects in computer games, 3D simulations and immersive virtual reality applications. More particularly, the embodiments described herein may relate to computer input apparatus and methods that map movements and actions of users in the real world to related movements and actions of interactive characters, vehicles and/or other animated objects in a computer simulated world. In some embodiments, the input apparatus and methods may be included in a wearable computer user interfaces capable of sensing user body movements using self-referencing tracking systems in order to control the locomotion of interactive characters in virtual reality gaming, simulation and training applications. There are also embodiments in the field of interactive fitness, for example, where the interface of the present invention may be used in conjunction with exercise equipment to the control the speed and direction of characters, vehicles or other animated objects in 3D games and computer simulated worlds. Other embodiments are in the field of robotics and Unmanned Autonomous Vehicles (UAVs) and may relate to the control of speed and direction of robots and UAVS in real-world environments.

The embodiments described herein exhibit many advantages over other approaches to virtual locomotion control.

In some embodiments avatar speed is controlled by the gait frequency of locomotive activities such as walking and running performed in place, while the heading direction of the avatar in the virtual world is controlled by the user's waist orientation. Other embodiments described herein also allow users to perform single stepping movements of arbitrary length and direction that involve actual translation of the user's feet (as opposed to stepping in place) and may also provide a more intuitive way of controlling heading direction independent of body orientation using the feet.

In some other approaches, spurious locomotion can be produced when the user shifts their weight from one foot to the other without actually initiating a stepping motion. This is not a problem in at least some of the embodiments described herein as in addition to foot forces, foot acceleration may also be taken into account when determining initiation and completion of stepping movements. This also allows users to change the direction they are facing in the real world without falsely triggering locomotion movement commands.

In at least some embodiments described herein, a virtual locomotion command is not generated if the user translates their body in the real world during performance of stepping, walking or running movements. Only motions associated with walking, running, jumping and crawling performed in place, as well as stepping motions performed with a single leg, are recognized. This feature is intentional as these embodiments are directed toward use in a limited space. Thus, there is no advantage to performing the actual movements with significant translation of the user's body. As a result, this feature reinforces the user's tendency to perform all motions within a limited area.

In embodiments accommodating single stepping movements, translational motion of the avatar's body may be achieved by the user lifting one foot, displacing it in the desired direction the desired amount, planting the foot on the ground, then immediately lifting the foot and returning it to the starting position. In terms of lift/plant sequences, a step may be registered in these embodiments based on a lift, plant, lift sequence (assuming the other foot remains fixed on the ground or has movement less than a defined amount). When the user lifts their foot to return it to the original position, the avatar may complete the user's step in the virtual world. That is, the user may step forward then back with the same foot while the avatar takes a total of two steps, one with each foot, in the virtual environment. The result is that the avatar's body translates the desired amount in the virtual world while the user's body does not translate in the real world. The length of the user's step may determine the magnitude of the avatar's translation in the virtual world while the direction of the user's step with respect to their forward body orientation may determine the relative direction of the avatar's step in the virtual world. Unlike other gestural approaches that require completion of the return movement of the foot or knee to its original position to determine the extent and direction of avatar movement, embodiments described herein determine this as soon as the user lifts their foot after making the initial step.

Also unlike other gestural approaches, in embodiments described herein avatar heading direction may be controlled by user foot orientation during walking and stepping motions, while avatar body orientation may be controlled by user waist/chest orientation. This allows users to keep their body, weapon or other handheld device oriented towards a target while independently controlling the direction of translational movement. This may also be useful in virtual sports games where defenders typically must keep their bodies oriented down field while changing their location on the field.

In addition, unlike other approaches, some embodiments described herein use sensors attached to the user's body due to use of a self-referencing body tracking system. As a result, these embodiments describe a self-contained system that may allow tracking of user body movements indoors or out.

Another limitation of some other approaches is that users are often required to face the television or computer display screen when interacting with such systems. As a result, a user may have a limited view of the world or be limited by the number of degrees-of-freedom the user can control simultaneously and/or have limited ranges of movement. For full immersion, embodiments described herein take advantage of a user's spatial awareness and support the fact that people can perform multiple tasks simultaneously with their hands and feet while operating in a 3D world.

In addition to the above, embodiments described herein employ a virtual locomotion controller (VLC) user interface and system to provide more natural and effective forms of avatar control in a virtual environment by using sensorimotor responses that more closely resemble tasks and actions that users physically perform in an equivalent real world situation. The VLC also permits and encourages users to control the avatar by making movements in the real world that are more closely resembled by the avatar in the virtual world. A VLC described herein may be used to control any type of avatar, such as a human-like or animal-like character, a vehicle or other entity in an interactive game, simulation or training application.

In one embodiment, for example, a user may take an initial step with either foot in the real world, then immediately return their foot to its original position. Characteristics of the actual step taken by the user in the real world may be analyzed by the VLC to determine foot lift and plant times as well as step length and step direction in order to control an avatar in a virtual world to take steps of similar length, direction, speed, etc. (in some embodiments, the animation of the avatar's foot may also track the user's foot during the initial step). By requiring the user to actually plant his or her foot after moving it, the user is encouraged to take real, life-like steps rather than simply performing leg motions (such as swinging or dragging his or her leg). Such an embodiment may be advantageous, for example, in training applications where it may be desirable for the user to learn the consequences of his or her physical actions or where fatigue due to physical activity can influence decision making abilities. Such an embodiment may also add to the quality of exercise a user may attain in an exergame application.

In this embodiment, however, the user may not be encouraged to take certain actual translational (e.g., not in place) steps in the real world. For example, as the VLC may be used in small spaces, it may be desirable to encourage a user to remain stationary to avoid collision with walls, furniture, equipment, etc. Additionally, it may be dangerous for the user to take actual translational steps while using the VLC described herein. For example, if the user is wearing a head-mounted display, the user may not be able to see where he or she is going. Similarly, in exergame applications, the user could be hurt by stepping off a piece of exercise equipment.

In another embodiment, the user can walk, jog or run in place to control avatar locomotion where the frequency of successive foot lifts determines the avatar speed and the user's yaw angle orientation in the real world determines the avatar's direction in the virtual world. In addition, while real, life-like motions by the user in the real world are often desirable, it may also be desirable on occasion for the user to control the avatar while standing relatively still (for example, after a user has been using the VLC for some time and has become tired, or in high speed environments). In another embodiment of the present invention, the VLC may enter a drive mode wherein the user may cause the avatar to make locomotive movements in the virtual world through application of foot forces. In such an embodiment, the VLC may detect or receive information pertaining to how much force a user has placed on front and back regions of his or her foot. The pressure placed on the front of the foot may control the forward speed of the user and the pressure placed on the back of the foot may control braking or backward speed. Direction of locomotion may be controlled by the relative orientation (e.g., yaw angle) of the user's waist with respect to his or her feet or an inertial reference.

To make the simulation even more lifelike, the user may also take on different bodily postures while taking actions, such as stepping or walking. The VLC may recognize the user's body posture and control the avatar to take on a similar posture in the virtual world. One such body posture may be a crouching posture. Another such body posture may be leaning.

In addition to stepping and moving with different bodily postures, the user may make other types of movements in the real world to control the avatar to perform similar movements in the virtual world. Two such movements include jumping and crawling. The VLC may detect a user jump when it detects or is notified that both of the user's feet have left the ground. The VLC may detect a user crawl based on the height and orientation of the user's body (such as the waist), which may correspond to a prone position, for example.

It will be appreciated that the term "avatar" as used herein may be an object in a computer generated world representing the user. Such computer generated or computer simulated worlds also may be referred to herein as "Virtual Worlds", "Virtual Reality" or "Virtual Environments", which may be considered equivalent and interchangeable. Avatars in these virtual worlds may take human-like form (e.g., bipedal), although they are not restricted to this form. Other forms may include legged animals, such as quadrapeds, hexapods, octapeds, etc., as well as ground vehicles such as bicycles, cars, motorcycles, etc., and air vehicles such as aircraft, birds and insects such as bees, dragonflies, etc. In response to commands provided by the user, avatars can move (e.g., translate and rotate) in a virtual world through various methods including common locomotion modes such as stepping, walking, jogging, running jumping, crawling, swimming, flying, etc. Avatars can be controlled by the user using a variety of perspectives including first person (i.e. through the eyes of the character), second person (through a camera view often above and behind the avatar head that tracks the position of the avatar in the world, but not its orientation), or a third person camera whose movements is independent of the position and/or orientation of the avatar (often fixed in the world).

Man/machine user interfaces capable of controlling the movements and actions of an avatar in a computer simulated world by monitoring the physical movements of various parts of the user's body in the real world may be referred to herein as a "Virtual Locomotion Controller". Applications for Virtual Locomotion Controllers may include use in computer games, virtual sports, interactive fitness applications, exploration of virtual worlds and training of soldiers and marines in immersive virtual reality combat simulation scenarios.

The term "self-referencing body tracking system" may be used herein to include a set of sensor components attached to or worn by a user that allows the position, orientation, force and/or other motions associated with one or more parts of the user's body to be determined relative to another part of their body without the need to reference components of such a system whose position and/or orientation are normally fixed with respect to a real-world environment. Sensor technologies that can be used in the construction of such self-referencing tracking systems may include optical, infrared, ultrasonic, force sensitive resistor or inertial devices, where inertial sensor devices may be further comprised of accelerometers, gyros and magnetometers. Mechanical linkages and/or bend sensors attached to the body can also be used to provide relative position or orientation data to the system.

Embodiments described herein may be directed toward achieving many objectives.

One object may be to provide a man/machine user interface that allows users to naturally control the speed, direction and orientation of their avatar in the virtual world through physical movements of their feet, legs and waist in a manner similar to locomotive activities such as stepping, walking, running, jumping and crawling. Such an approach not only makes user interfaces more intuitive and easy to use, but it also allows the user to freely look around as they move through the virtual environment as well as use their hands for manipulation tasks such as aiming and firing a weapon, swinging a sword or racquet and for communication tasks such as pointing, signaling and other hand gestures.

Another object may be to allow a non-seated user walking or stepping in place in the real world to control the magnitude and direction of avatar translation in the virtual world.

Another object may be to allow the user to control the magnitude and direction of avatar translation independently from avatar body orientation with respect to the virtual world.

Another object may be to enable support for control of other common body postures and movements such as kneeling, crouching, crawling and jumping.

Another object may be to make stepping movements more intuitive and response to user inputs.

Another object may be to provide a lightweight, wearable system containing a self-referencing tracking system for sensing user body movements.

Another object may be to provide a man/machine user interface for virtual locomotion control that can be used independently while standing or in conjunction with exercise equipment such as treadmills, elliptical machines, stationary bikes, stair climbers, etc.

Another object may be to enable users to control avatar position and orientation in unmodified, off-the-shelf games by extracting game state information from particular regions of the display screen using image processing and pattern matching techniques.

Another object may be to provide an initial low-cost solution that enables additional functionally to be obtained through incremental upgrades to the sensor hardware.

In the following sections, detailed embodiments of a Virtual Locomotion Controller (VLC) apparatus and methods are described.

FIG. 1 is a diagram of a virtual locomotion user interface system 10 according to an embodiment. The illustrated interface 10 includes a body tracking unit 20 coupled to a virtual locomotion controller (VLC) 40 via a wireless or wired communication link 34. The body tracking unit 20 and the VLC 40 may operate together with a display (not shown) and a software application 66 (e.g., a video game, exergame or training program) running on the same or a different processor as the VLC to control the locomotion of an avatar displayed on the display, based at least on the movements and actions of a user in the real world.

The illustrated body tracking unit 20 may include sensors located at different parts of the user's body to detect and/or monitor his or her movements. In addition, the illustrated body tracking section 20 includes sensor interface electronics 30, which may accumulate data from the sensors and transmit the accumulated data to the VLC 40. More specifically, the illustrated body tracking section 20 may include a head tracking sensor 22, lower and upper arm tracking sensors 23 and 24, hand tracking sensors 25, a waist tracking sensor 26, chest tracking sensor 27, lower and upper leg tracking sensors 28 and 29, foot tracking sensors 30, foot force sensors 31 and sensor interface electronics 32 at the waist, ankles and wrists and an optional handheld or hand worn device 33 with additional buttons or finger tracking inputs. More or less sensors may be included than are actually shown. For example, additional sensors may be included at other locations on the user's body (e.g., chest and thighs) or some of the illustrated sensors may not be used at all. Sensors or sensor systems fixed in the environment capable of tracking user body movements (including those utilizing infrared or stereo cameras) also may be used to provide data similar or equivalent to that obtained from attaching sensors to the body as described above.

Various types of sensors and sensor technologies may be used alone or in combination (including, but not limited to inertial, optical, ultrasonic, radio frequency (RF), resistive or magnetic) depending on, for example, the application in which the virtual locomotion system interface 10 is implemented, the locomotion modes that the virtual locomotion interface 10 includes and other factors. Examples of different sensors that may be used are discussed in more detail below with respect to FIG. 3.

The sensor interface electronics 30 may transmit the accumulated data to the VLC 40 over the communication link 34. More or less sensor interface electronics may be included than are actually shown. For example, not all embodiments may include interface electronics at the wrist locations and waist, and additional interface electronics may be included (e.g., at the head location or at the chest and thighs).

The illustrated VLC 40 includes various modules that may receive the data from the body tracking unit 20, analyze the data and generate control signals to control the locomotion of the avatar on the display based at least on the analyzed data. More specifically, the illustrated VLC control processor 40 includes a device manager 50, which itself includes a data acquisition and pre-processing unit 52 in communication with a body posture estimator 54 and lift/plant feature detectors 56. The illustrated device manager 50 is in communication with locomotion control logic 58, which is in communication with an animation controller 60 and a virtual input controller 64. Depending on, for example, the application that the VLC 40 is implemented in connection with, either the animation controller 60 or the virtual input controller 64 may receive information from the locomotion control logic 58.

The animation controller 60 may be configured to receive animation data 62 and provide data for at least one movement command involving avatar body position and orientation transforms as well as other animation commands to an external application (such as simulation/game application 66). The virtual input controller 64 may map the received information from the locomotion control logic 58 to key or button presses, mouse movements or joystick commands that may be used as inputs to control an avatar in an interactive game or simulation application. While the embodiment shown in FIG. 1 includes both the animation controller 60 and the virtual input controller 64, the VLC 40 may include just one of these controllers.

Figure 2:
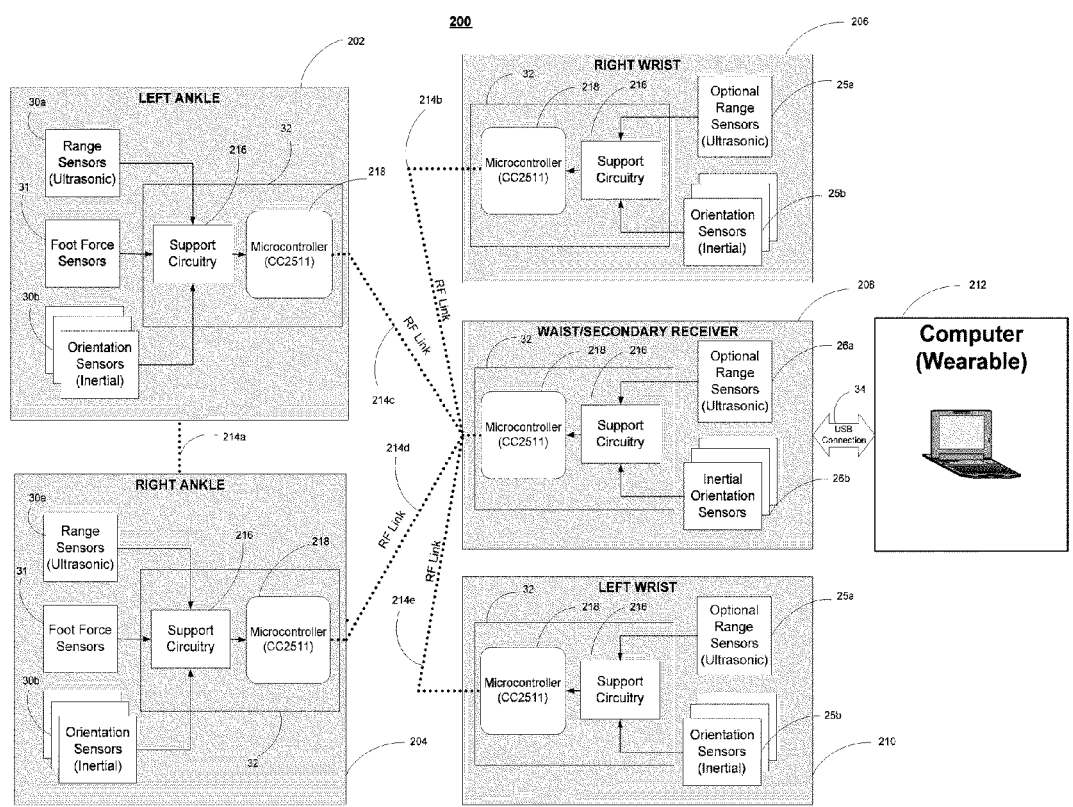
FIG. 2 is a block diagram showing electronic components of a virtual locomotion controller interface.

FIG. 2 is a block diagram illustrating an embodiment of the sensor interface electronics 32 of the body tracking unit 20. In the embodiment illustrated in FIG. 2, the sensors (30 of FIG. 1) disposed at the left and right feet and/or ankles and of the user's body may include ultrasonic range sensors 30a and inertial sensors 30b, and the associated interface electronics 32 located at the left ankle 202 and right ankle 204 includes support circuitry 216 and a microcontroller 218 (e.g., a CC2511 microcontroller by Texas Instruments). The sensors (25 of FIG. 1) disposed at the right and left hands and/or wrists and of the user's body may include optional ultrasonic range sensors 25a, inertial sensors 25b and a handheld controller containing various buttons and switches, and the associated interface electronics 32 located at the left wrist 206 and right wrist 210 includes support circuitry 216 and a microcontroller 218. The sensors (26 of FIG. 1) disposed at the waist of the user's body include optional ultrasonic range sensors 26a and inertial sensors 26b, and the associated interface electronics 208 includes support circuitry 216 and microcontroller 218. The system can also be configured with an additional secondary receiver 208 configured to receive the same data as the interface electronics located at the waist in order to monitor the user's activities on a computer independent from the one hosting the VLC 40. In the illustrated embodiment, the VLC control processor is implemented on a personal computer (PC) such as a notebook computer or wearable PC 212, and the body tracking unit 20 are coupled to the PC 212 via a USB connection 34. This PC may or may not include the game or simulation application containing the avatar to be controlled by the VLC. Each of the microcontrollers 218 at each of the left ankle, right ankle, right wrist and left wrist location may be coupled to the microcontroller 218 at the waist location and/or optional secondary receivers via respective RF links 214b, 214c, 214d and 214e. An additional RF link may be provided between the interface electronics located at the left and right ankles (blocks 202 and 204 in FIG. 2 respectively) to facilitate communication therebetween.

In the embodiment illustrated in FIG. 2, the sensors associated with each of the different body locations (e.g., left ankle, right ankle, right wrist, left wrist and waist) provide raw sensor data to the associated microcontroller 218 via the associated support circuitry 216 located at the respective body location. The individual microcontrollers 218 at the left ankle, the right ankle, the right wrist and the left wrist locations may beam the collected data to the microcontroller 218 at the waist location and optionally to a secondary receiver attached to the same or a different computer. The microcontroller 218 at the waist location may collect data from its own attached inertial orientation sensors 26b and optional ultrasonic range sensors 26a and combine the collected data with data received from the microcontrollers 218 located at the feet and wrist locations. The microcontroller 218 at the waist and/or secondary receiver also receiving such data may communicate the combined data to the PC 212 using the USB connection 34 or any other connection (e.g., an RF connection).

Figure 23:
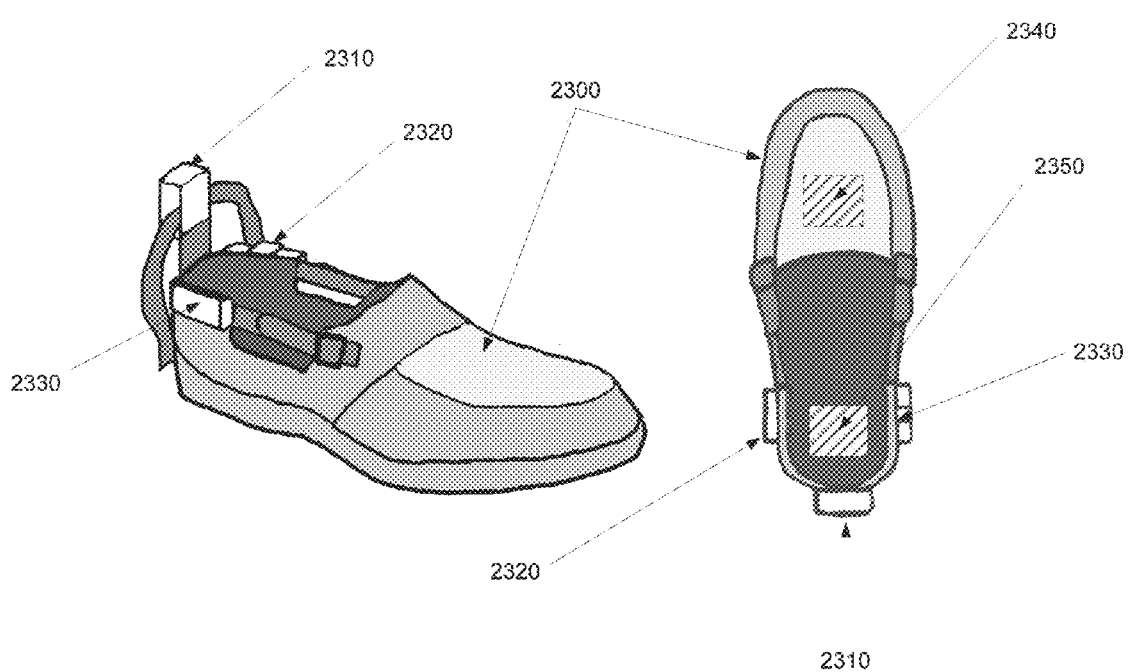
FIG. 23 shows a detailed view of an embodiment of overshoes used in conjunction with the virtual locomotion controller, including the location of the ultrasonic sensors, inertial sensors, force sensors and interface electronics module.

Real-time tracking of body motions in the VLC may be accomplished using inertial motion tracking technology based on solid state gyros and accelerometers, ultrasonic range sensors and foot forces (However, the system of the present invention is not limited by these types of sensors or sensor technologies. In other embodiments optical systems utilizing infrared and stereo cameras may also be used). The ultrasonic sensors may provide data representing the distance (or range) between the feet. In an embodiment, the ultrasonic sensors provide line of site distance readings from the right foot to the front, middle and back of the left foot based on ultrasonic signal travel time. The orientation of the left foot with respect to the right foot can also be computed from such range data by using the law of cosines, since the distance between the front, middle and back sensors attached to the left foot are known in advance. The orientation of the waist may also be provided from the inertial sensor 26b, which in an embodiment, is located between the user's waist and chest. The inertial sensors may provide orientation data in the form of, for example, rotation matrices, Euler angles and quaternions, as well as acceleration data in body-relative coordinates. The force sensors (including force sensitive resistors (FSRs)) may allow real-time tracking of foot forces at the toe and heel by, for example, placing inserts containing the FSRs into overshoes as shown in FIG. 23, directly into the user's shoes or under the user's feet. The FSR sensors may produce force or pressure data that may be used by the Virtual Locomotion Controller in the computation of locomotion speed commands.

Figure 3:
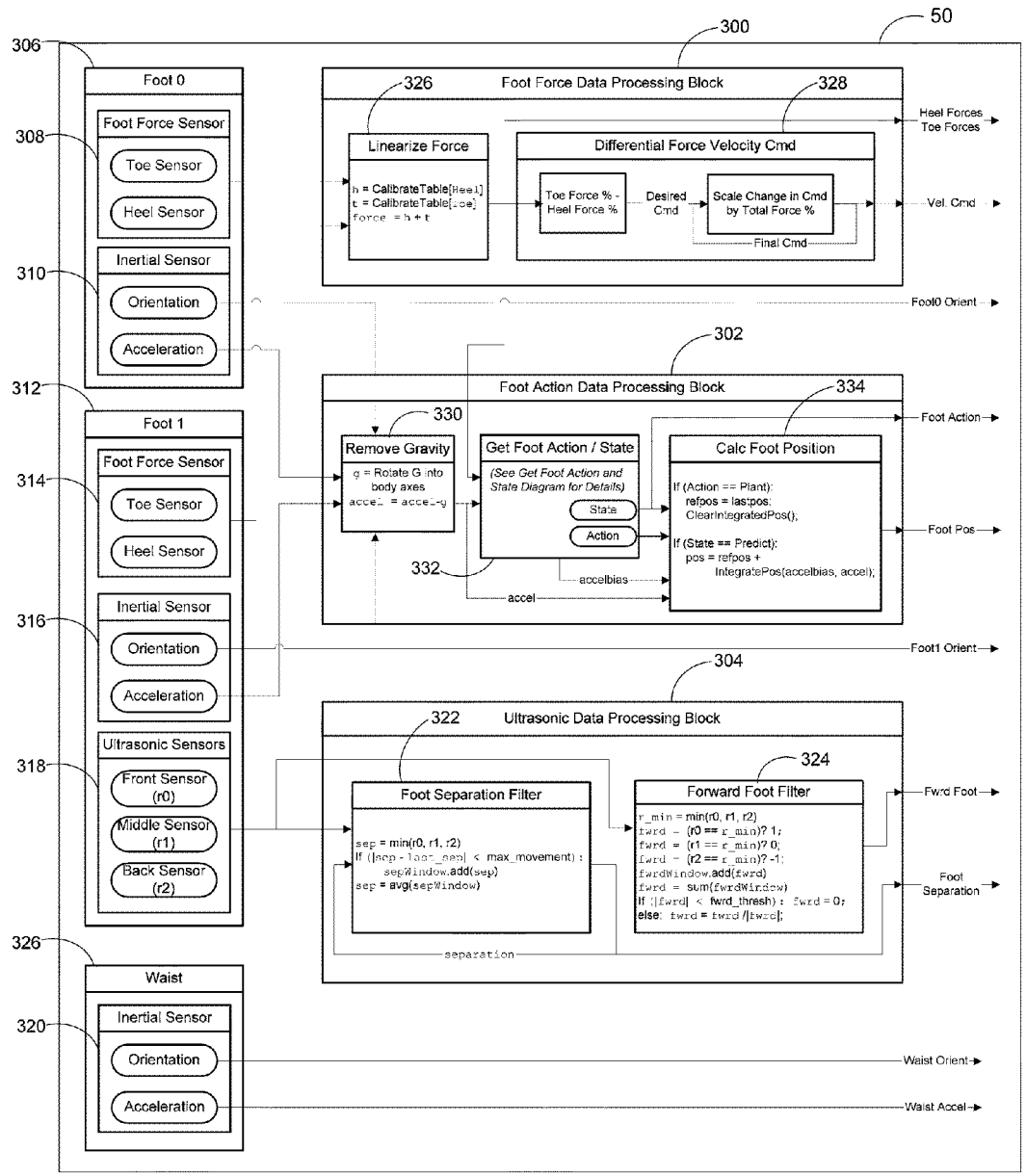
FIG. 3 is a block diagram showing the data acquisition and pre-processing functions of a device manager.

FIG. 3 is a block diagram illustrating an embodiment of the device manager 50 showing data acquisition and pre-processing in the device manager 50. The illustrated device manager 50 includes a foot force data processing block 300, which receives as inputs foot force data from foot force sensors 308 and 314 of user feet 306 and 312; a foot action data processing block 302, which receives as inputs acceleration and orientation data from inertial sensors 310 and 316 of feet 306 and 312; and a foot separation data processing block 304, including a foot separation filter 322 and a forward foot filter 324, which receives as an input range data from ultrasonic sensors 318 of the foot 312.

The illustrated foot force data processing block 300 is configured to receive foot force data from foot force sensors 308 and 314 of the user's feet 306 and 312. The foot force data processing block 300 includes a linearize force sub-block 326, which may be configured to linearize voltage readings from the foot force sensors 308 and 314 by mapping these voltage readings to force values from a predefined calibration table based on Voltage vs. Force curves. After the voltage readings are linearized, toe and heel force values for each foot may be added such that the resulting value may be output as the Total Force.

The toe and heel forces may also be used to calculate a desired velocity command (Vel. Cmd) that may later be used to control avatar locomotion speed in the virtual world. The idea behind this velocity command is that shifting weight forward on the foot towards the toe increases avatar translational speed while shifting weight backward towards the heel decreases it. The velocity command may, for example, range from −1 to 1. The velocity command may be calculated in the differential force velocity command block 328. The illustrated velocity command block 328 is configured to subtract the fractional saturation of the heel sensor from the fractional saturation of the toe sensor, where maximum and minimum force values for each sensor may be determined by the user during a calibration routine. In order to prevent velocity changes when a user takes his or her foot off the ground, the desired command change may be scaled by the total fractional force saturation (toe+heel) and then added to the velocity command from the previous frame. The resulting value may then be output as the velocity command (Vel. Cmd) for the current frame.

The Foot Action Data Processing Block 302 may make use of foot acceleration data and orientation data from sensors 310 and 316 of each foot 306 and 312 and force data from sensors 308 and 314. The illustrated Foot Action Data Processing Block 302 includes a remove gravity sub-block 330, a get foot action/state sub-block 332 and a calculate foot position sub-block 334. The illustrated remove gravity sub-block 330 is configured to remove the influence of gravity from the acceleration data, for example, by rotating the gravitational vector into the sensor frame using sensor orientation data then subtracting this value from the input acceleration reading. The result may be provided to the Get Foot Action/State sub-block 332. The Get Foot Action/State sub-block 332 is described in more detail with respect to FIG. 4. The illustrated Get Foot Action/State block 302 is configured to determine if the foot is in the air (State=Predict), on the ground (State=Estimate) or undetermined (State=Idle). The Get Foot Action/State block 302 also determines when a foot is lifted off the ground (Action=Lift) or makes contact the ground (Action=Plant). The State and Actions values determined by the Get Foot Action/State block 302 may be provided to the calculate foot position sub-block 334. The illustrated calculate foot position sub-block 334 is configured to integrate the acceleration data obtained from the Remove Gravity sub-block 330 each frame while the foot is in the air (State=Predict) by adding the total computed displacement to the foot position value from before the Lift action occurred, known as the refpos. When the Foot Plant action is detected, the total computed foot position value is output, then may be cleared or stored as the starting point for the next step. If stored, an accumulated value for the position of the foot after each step may be used downstream in other processing blocks to estimate the current foot position. The final outputs from the foot action data processing block 302 may be the foot action (Lift or Plant) and the foot position (Foot Pos).

The Foot Separation Data Processing Block 304 may use range data from ultrasonic sensors 318 of the foot 312 to calculate the separation between the feet and determine which of the feet 306 and 312, if any, is in front. The foot separation filter 322 may determine the separation reading for the current frame by taking the smallest reading from each of the ultrasonic sensors. To minimize error in ultrasonic ranging measurements, the filter 322 may keep a window of measurements over the past N frames. The current reading may be tested to check that it is within a reasonable distance from the filtered separation value of the previous frame. If the current measurement is within an acceptable offset, it may be added to the measurement window. The separation value returned from the filter 322 may be the average value of all measurements in the measurement window. The Forward Foot Filter 324 may similarly correct for infrequent errors in forward foot determination. A similar measurement window may be stored containing fixed M measurements. The forward foot filter may find the sensor with the minimum reading for this frame and add a 1 (front sensor), 0 (middle sensor) or −1 (back sensor) to the window depending on the sensor with the minimum reading. The values in the window may then be added together. If the result is within a threshold (fwrd_thresh) of zero, the forward foot may be none. Otherwise, the forward foot may be determined by the sign of the summation result. The outputs of the foot separation data processing block 304 may be Separation and the Forward Foot (Fwrd Foot).

Orientation values from the inertial sensor 320 of the waist 326 may be passed through the device manager 50 as outputs.

Figure 4:
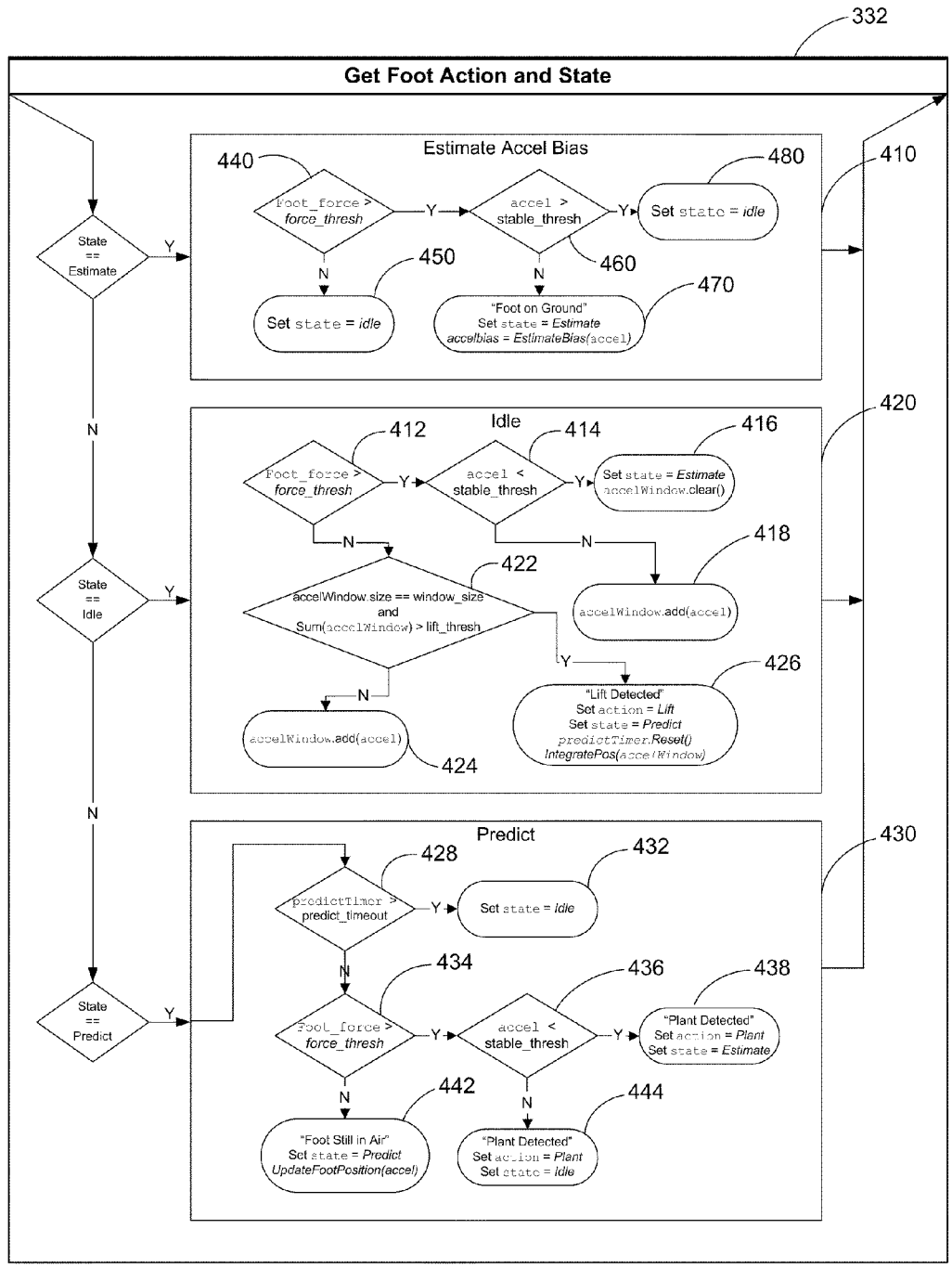
FIG. 4 is a flow chart diagram showing the lift/plant feature detectors of a device manager.

The Get Foot Action and State Block 332 is illustrated in FIG. 4. The illustrated Get Foot Action and State Block 332 is a state machine with three states. The estimate state 410 may be applied when the foot is in contact with the ground and is stable enough to estimate an acceleration bias error associated with the accelerometers contained in the inertial sensors 310 or 316. In the idle state 420, the foot may not be stable enough to estimate the acceleration bias error, or may not yet be determined to have been lifted. In the predict state 430, the foot may be determined to have been lifted off the ground.

In the illustrated estimate state 410, the foot force may be checked in item 440. If the foot force (Foot_force) is above a threshold value (force_thresh), the foot is determined to be on the ground. Otherwise, the foot is not on the ground and the state machine transitions to the idle state 420 in item 450. In item 460, the acceleration of the foot may be compared to a threshold value. If the foot is on the ground and the acceleration is low enough, it may be added to the acceleration bias estimator in item 470. Otherwise, the foot is too unstable for acceleration bias estimation and the state machine enters the idle state 420 in item 480. To estimate the acceleration bias, a window of bias acceleration vectors may be assembled, and all of the bias acceleration vectors may be added together for the final bias vector.

In the idle state block 420, the user's foot may be checked to determine whether the foot is stable (e.g., foot_force>force_thresh and accel<stable_thresh) in items 412 and 414. If so, the state machine returns to the estimate state 410 in item 416. Otherwise, the current acceleration may be added to a window of acceleration values in item 418. When the window reaches a preconfigured size in item 422, all of its acceleration vectors may be summed together in item 424. If the magnitude of the result is above a threshold, the idle state block 420 determines in item 426 that the foot was actively lifted from the ground at about the time that the first acceleration reading was added to the acceleration window. All of the values from the acceleration window may then be integrated to find the position reached since the beginning of the lift. The integration may use acceleration values with the acceleration bias calculated in the Estimate State subtracted out. Finally, the action may be set to lift and the state may be set to predict.

In the predict state 430, it may be determined whether the foot has not been in the air for more than a defined period of time (predict_timeout). If not, whether the foot is now on the ground may be checked in item 434. If it is, the action is set to plant, and the state may be set to estimate or idle based on the size of the acceleration vector in items 436, 438 and 444. If the foot has not been in the air for longer than the defined period of time and it is not on the ground now as determined in item 434, nothing else occurs in the state machine (step 442). Outside, in the FootActionDataProcessing block 302, the current acceleration (minus the bias) may be integrated to update the current foot position in block 334. It will be appreciated that in another embodiment where a different set of sensors or sensor technologies were used in the body tracking unit 20, the implementation details of the foot action data processing block 302 and the foot separation data processing block 304 would change accordingly to enable the overall functionality of these blocks in terms of the output data produced to remain the same.

Figure 5:
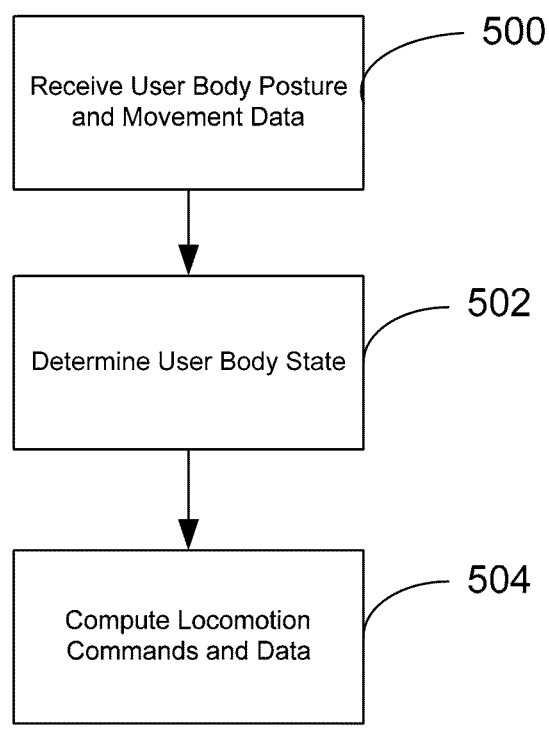
FIG. 5 is a flow chart illustrating steps in a method of controlling the actions of an avatar.

FIG. 5 illustrates steps in a method of controlling the actions of an avatar on a display using data collected from the body tracking unit 20. In an embodiment, the VLC 40 may be configured to execute the method of FIG. 5.

In step 500, the VLC 40 may receive data representing the user's body posture and movement from the body tracking unit 20. In an embodiment of the present invention, the data acquisition and pre-processing unit 52 of the device manager 50 receives raw data from one or more of the sensors 22, 23, 24,25, 26, 27, 28 29, 30 and 31.

In step 502, the VLC 40 determines the user body state from the received user body posture and movement data. In an embodiment, the data acquisition and pre-processing unit 52 processes the raw data received from the one or more sensors to determine one or more of the following variables characteristic of user body state information: the user's feet separation, orientation of the user's feet and waist, acceleration of the user's feet and contact forces at the heel and toe of each of the user's feet. The data acquisition and pre-processing unit 52 may pass the determined body state information to at least one of the body posture estimator 54 and the lift/plant feature detectors 56 for further processing. In another embodiment, the body posture estimator 54 may determine the current body state of the user given the foot forces and orientation of various parts of the body, such as 22, 23, 24, 25, 26, 27, 28, 29, 30 and/or 31, which may be tracked and processed by the data acquisition and pre-processing unit 52. In yet another embodiment, the body posture estimator 54 may determine the current body state of the user given the foot forces and the orientation of the ankles and waist as determined by the data acquisition and pre-processing unit 52 using inverse kinematics techniques. In yet another embodiment, the body posture estimator 54 may use inverse kinematics techniques to determine the current body posture state of the user given sensor data representing the position and orientation of the user hands, feet, head and waist. The lift/plant feature detectors 56 may determine when each foot has been lifted or planted on the ground. Information about the current body state of the user and when each foot has been lifted or planted on the ground may then be passed to the locomotion control logic 58, which may determine at least one of speed, direction and style of the user's locomotion.

In step 504, the VLC 40 computes the locomotion commands and data. The animation controller 60 may receive information about desired avatar movements as determined from the user body state, including control mode, step, orientation, speed, direction and locomotion style commands from the locomotion control logic 58 and combines this with information corresponding to a set of animations 62 representing, for example, avatar stance, walking, jogging, running, jumping and crawling movements, in order to control the movement and posture of an avatar in a virtual environment such as a game, simulation or training application. The animation controller 60 may use the received information to determine position and/or orientation data for at least one of joint of the avatar body representing the position and orientation of the avatar in the virtual world, as well as associated animation commands to be used for controlling the avatar animation on a display screen.

Figure 6:
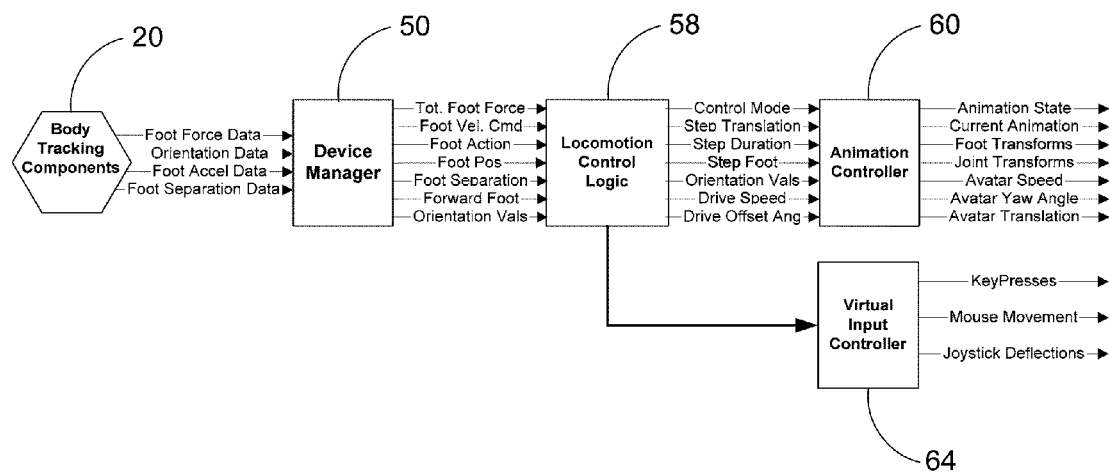
FIG. 6 is a block diagram showing a data flow for a virtual locomotion controller.

FIG. 6 is a block diagram showing a more detailed data flow for the body tracking section 20 and the VLC 40 according to an embodiment of the present invention. In the embodiment illustrated in FIG. 6, raw data from the body tracking section 20, including, for example, the inertial acceleration and orientation, ultrasonic range and foot force sensors, provides the inputs to the VLC 40. Data from these devices may be processed by the device manager 50, which may in turn output data that the locomotion control logic block 58 may use to determine a user's desired control mode (e.g., stance, step and drive) and control values (e.g., speed and direction). This data may be sent to the animation controller 60 or the virtual input controller 64. More detailed data flows for embodiments of the animation controller 60 and the virtual input controller 64 are illustrated below in FIGS. 6 and 7.

Figure 7A:
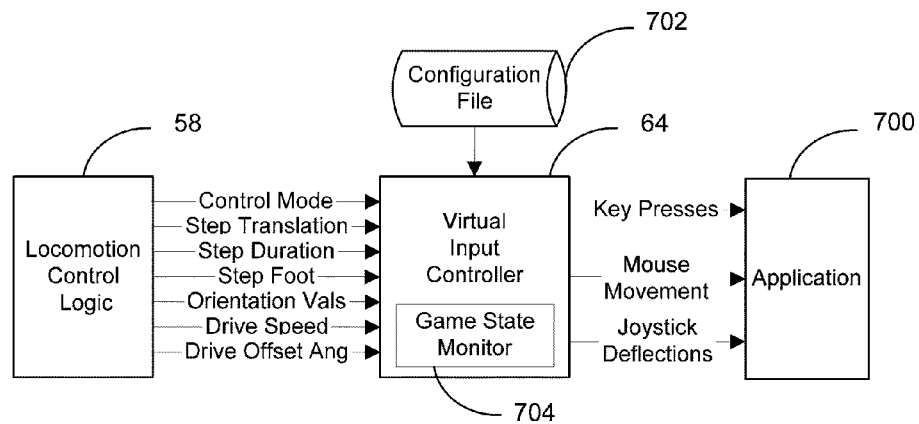
FIG. 7A is block diagram showing a data flow for a virtual input controller.

FIG. 7A is a block diagram showing a more detailed data flow for an embodiment of the virtual input controller 64. Using a configuration file input to the virtual input controller 64, the virtual input controller 64 may map the outputs of the locomotion control logic 58 to key presses, mouse movements, joystick deflections or other control inputs that may be used as simple input commands to control a game entity, such as an avatar, a character or a vehicle in an interactive game or simulation application.

In addition, the virtual input controller 64 may also include a game state monitor module 704. The game state monitor may allow the virtual input controller to output commands controlling avatar states including position, speed, direction, and/or orientation in unmodified, commercial off-the-shelf games by extracting current game state information from particular regions of the display screen using image processing and pattern matching techniques as shown in FIG. 7B.

Figure 7B:
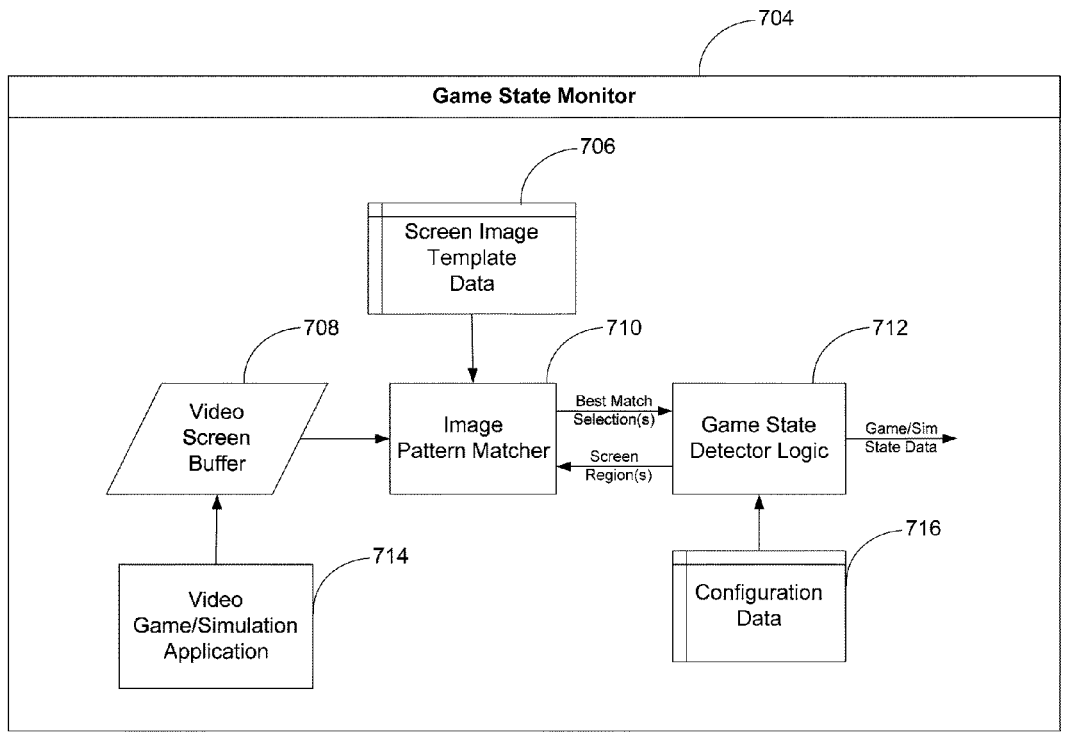
FIG. 7B is a block diagram of a game state monitor function of a virtual input controller.

The game state monitor module 704 illustrated in FIG. 7B includes an image pattern matcher 710, which may be configured to receive screen image template data 706. The image pattern matcher 710 may be coupled to a video screen buffer 708 and game state detector logic 712. The video screen buffer 708 may be coupled to a video game/simulation application 714. The image pattern matcher 710 may be configured to receive inputs from the video screen buffer 708 and screen region information from the game state detector logic 712 representing where the game state information is displayed on the display screen and, using such inputs and a set of screen image template data 706, determine the image template that best matches the game state information displayed on the display screen in the given screen region. The image pattern matcher may then output information representing the best match template to the game state detector logic 712. The game state detector logic may be configured to receive configuration data 716 and, using the configuration data and the best match template information, generate and output information representing the current state of the avatar in the game or simulation application such as its position, speed, altitude, direction, and/or orientation. This information can then be used by the virtual input controller 64 to produce appropriate keyboard, mouse, joystick or other outputs that allow the user to control such avatar state variables in the game or simulation application using body movements such as walking, running, leaning and jumping.

Figure 8:
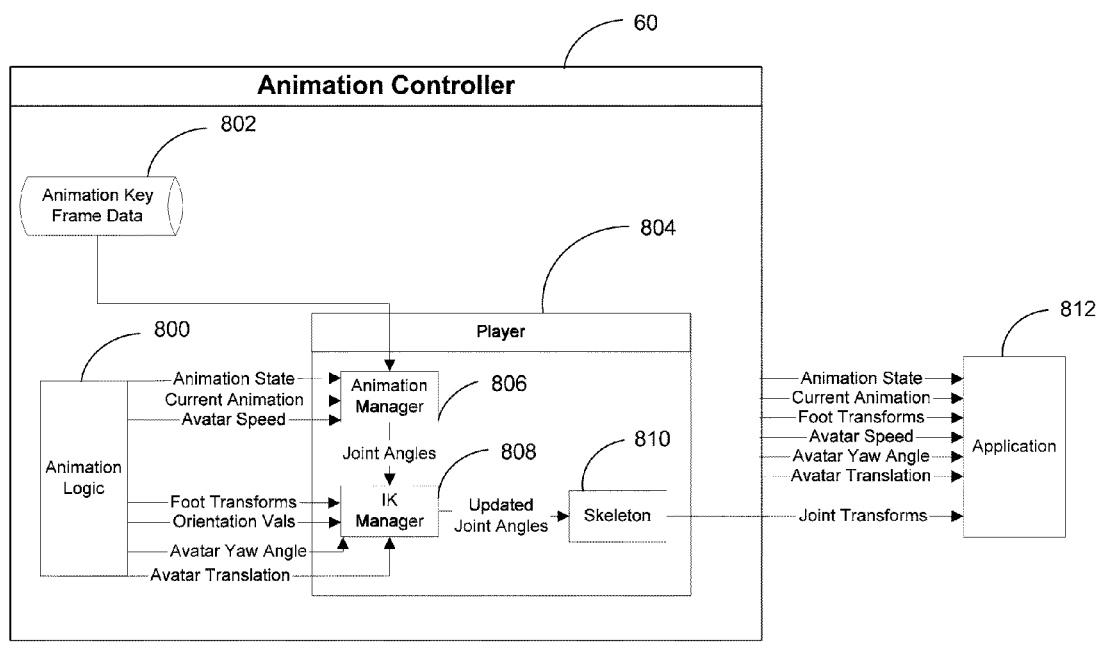
FIG. 8 is a block diagram showing a data flow and functions of an animation controller.

FIG. 8 is a block diagram showing a more detailed data flow for an embodiment of the animation controller 60. The illustrated animation controller 60 includes animation logic 800, an animation key frame data store 802 and an animation player block 804. The animation player block 804 itself includes an animation manager 806, an inverse kinematics (IK) manager 808 and a skeleton 810 and provides outputs to an application 812.

If the data is routed directly from the locomotion control logic 58 to the animation controller 60, the control modes and values may be used to directly control the animation associated with a specific character. The animation logic block 800 may use data obtained from the locomotion control logic 58 to select a desired animation to play from the animation key frame data store 802 and calculate position and orientation transform values for the avatar's waist (or root), which may be routed to the animation player block 804.

The animation player block 804 may read in character skeleton and animation keyframe data from the datastore 802 and set joint values of the skeleton 810 based on values from the selected animation provided by the animation manager 806 and inverse kinematics calculations provided by the IK manager 808. The set joint values may determine how to change the avatar's body joint angles to position and orient the avatar in the virtual world based on the set of target transforms received from the animation logic block 800. A set of skeleton joint transforms (e.g., involving position and rotation data) may be provided by the skeleton 810 to the target application 812.

The VLC 40 may be configured to enable users to specify a character's locomotion style, speed and direction by assuming body postures and/or by performing actions normally associated with that type of movement (e.g., walking, jogging, running, jumping, running, and crawling). In this regard, the VLC 40 may have different modes of operation, which it may switch between depending on the body postures and/or actions performed by the user.

Figure 9:
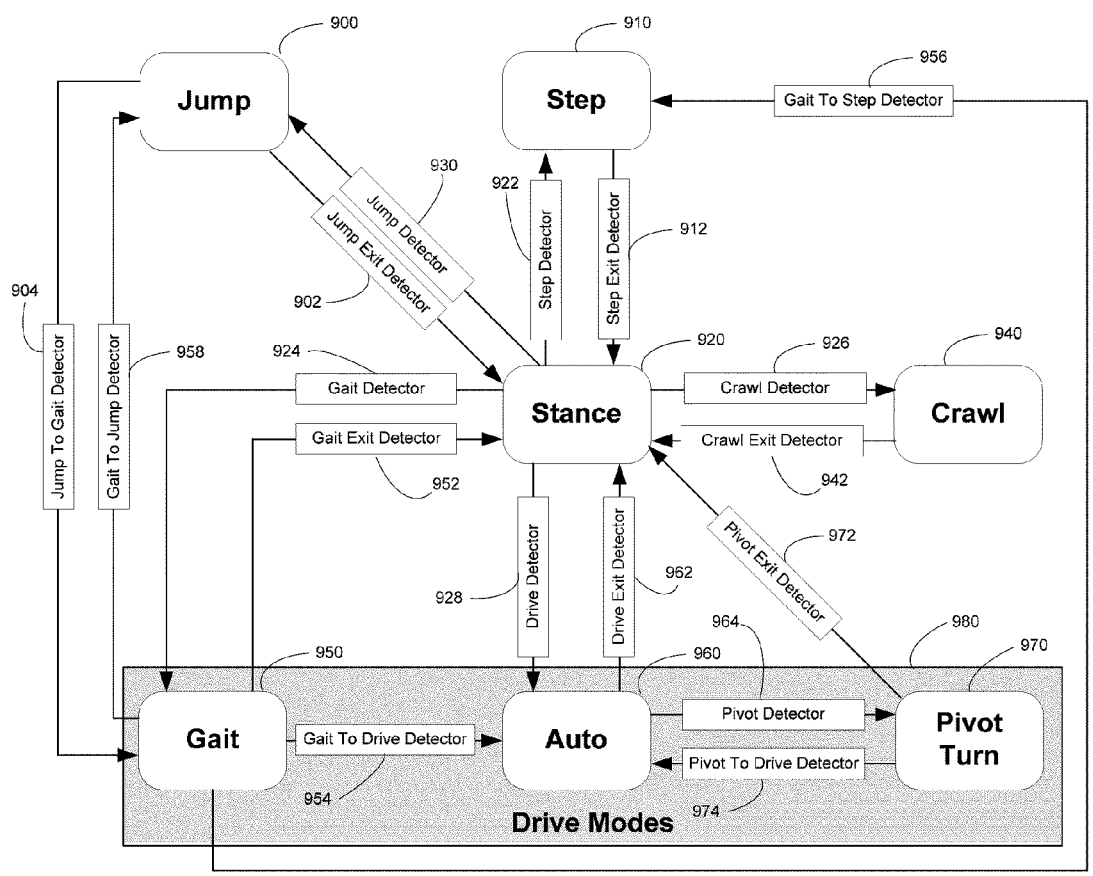
FIG. 9 is a state diagram illustrating several potential modes of operation that a virtual locomotion controller (VLC) may enter and exit.

FIG. 9 is a state diagram illustrating several potential modes of operation that the VLC 40 may enter and exit. The illustrated embodiment includes three main modes of operation (or states), including step, stance and drive modes 910, 920 and 080, respectively. The different modes may be entered and exited based on outputs provided by individual state detectors 956, 912, 922, 926, 942, 924, 952, 928, 962, 954, 972 and 974 associated with the respective modes. General details of the state detectors are described below and in the table of FIG. 13, with more specific details illustrated in FIGS. 14-21.

The state of the locomotion control logic 58 may begin in the stance mode 920 and use a number of detectors to determine whether the user's actions signify a command to enter another locomotion mode. The detectors may look at time and distance constraints such as specific patterns of foot lifts and plants along with various ranges of foot position and separation to determine whether to transition to a particular state. Once a state becomes active, various parameters associated with that state may become significant. The system may determine the values for these parameters based on user input from the device manager 50.

Stance mode 920 may be the default or "home" VLC state. In the stance mode, the system does not recognize locomotion-like movements (e.g., such as stepping or walking in place) but allows the user to shift their weight from foot to foot or change their body orientation in the real world. In this mode, as the user alters their body orientation in the real world, the avatar on the display may take appropriate steps in the virtual world to mirror the user's foot movements and changes in their body orientation. From the stance mode, the system may transition into any of the other modes, including the jump mode 900, the step mode 910, the crawl mode 940, and any of the drive modes (including gait 950, auto 960 and pivot turn 970) based on the detection of particular user movements. The stance mode may be entered, for example, at system startup or when the conditions required for entering a different state are no longer met and, responsively, the VLC 40 transitions back to the stance home state 920.

When the stance mode 920 is active, user waist yaw values may be output from the locomotion control logic 58 every on every update cycle (sometimes referred to herein as a frame). In the animation logic block 800 of the animation controller block 60, when the offset between a user's waist yaw angle value and a stored avatar waist yaw angle value passes a predefined threshold, the avatar's body may be turned to reorient its legs with its waist. Animation logic 800 may also animate the avatar foot positions and orientations based on the user's foot position and orientation or automatically generate a sequence of animated stepping movements necessary to align the direction the avatar's body is facing with the direction the user's body is facing, as determined by the waist yaw angle of the avatar and user, respectively. If the locomotion control logic 58 is in any state other than stance, however, the animation logic 800 may not perform these operations because other locomotion control logic states may require their own set of foot transformations and movements. In another embodiment, when the stance mode is active, foot lift and plant events and foot translation information may also be output from the locomotion control logic 58 every frame. The Animation logic 800 may use this data in real time to control avatar foot positions and foot orientations to match those of the user instead of controlling avatar foot positions and orientations as a function of the user's waist yaw angle. When real-time foot tracking is enabled, the animation logic 800 may make use of locomotion control logic 58 state information to override or reinterpret its tracking of the user's foot movements. In this way real-time foot tracking and locomotion commands can function together seamlessly.

In the step mode 910, the user may command his or her avatar to take single steps of any length and in any direction in the virtual world by initiating a similar step in the real world and then returning his or her foot to its original position. Since the user returns their foot to its original position, there is no net translation of the user's body in the real world. However, in the present embodiment the avatar does not return its foot to the original position (like the user), but completes the step in the virtual world by moving its other foot the same distance and in the same direction, resulting in a net translation of the avatars body in the virtual world. An example embodiment showing how right and left steps taken by the user in the real world correspond to the avatar taking right and left steps in the virtual world is illustrated in FIG. 10.

Figure 10:
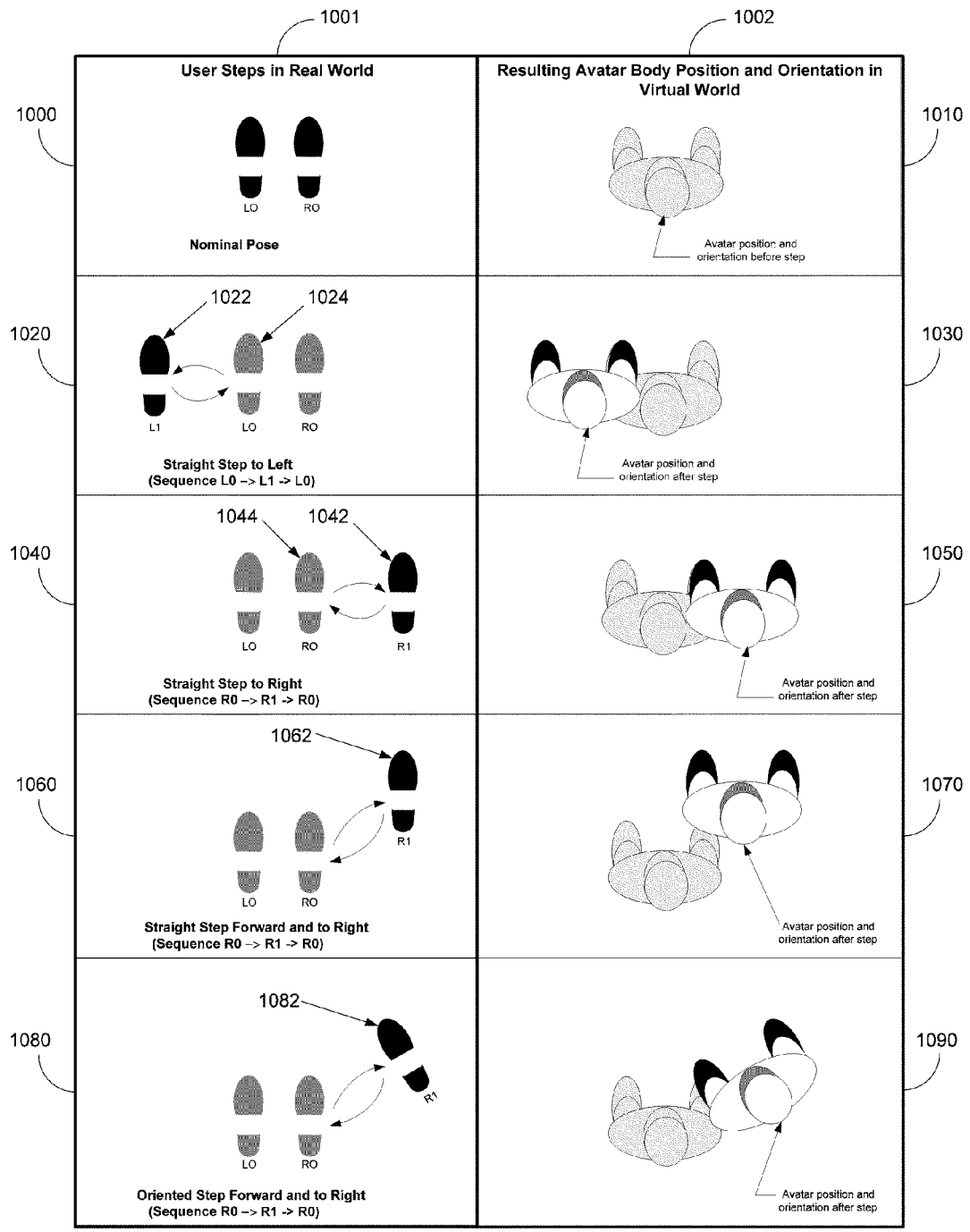
FIG. 10 is a diagram showing how steps taken by a user in the real world correspond to changes in an avatar position and orientation in the virtual world.

In FIG. 10, the positioning of the user's feet is shown for five example scenarios: a nominal pose 1000, a left side step sequence 1020, a right side step sequence 1040, a step forward and right sequence 1060 and a oriented step forward and right sequence 1080. Column 1002 of FIG. 10 illustrates how the avatar may move on the display in response to the user's real world steps 1001. Each of the scenarios is described in more detail below.

In the nominal pose 1000, the user's feet may both be approximately hip width apart or some other distance such that the user's left foot is in a position L0 1002 and the user's right foot is in a position R0 1004. When the user's feet are in the nominal pose, the VLC 40 may enter the stance mode 904 illustrated in FIG. 9. Anytime the user enters the stance mode 920, the locomotion of the avatar displayed on the display may smoothly come to a stop.

In the left side step sequence, the user may take one step to the left in place. In this sequence, the left foot becomes a primary foot, since it initiated the step, and the right foot becomes a secondary foot. As illustrated in FIG. 10, for example, the user may begin in the nominal pose 1000 and the VLC 40, accordingly, may begin in stance mode 904. The user may then lift his or her left foot and move it to the left 1020. The user may then plant his or her left foot in position L1 1022. Then, the user may again lift his or her left foot, return it to its original position L0 1024 and plant it there. The illustrated foot position sequence of (L0, R0)→(L1, R0)→(L0, R0) may cause the avatar to take one step to the left in the virtual world 1030.

Similarly, in the right side step sequence, the user may take one step to the right in place 1040. As illustrated in FIG. 10, for example, the user may begin in nominal pose 1000 and the VLC 40, accordingly, may begin in stance mode 904. The user may then lift his or her right foot and move it to the right. The user then plants his or her right foot in position R1 1042. Then, the user may again lift his or her right foot, return it to its original position R0 1044 and plant it there. The illustrated foot position sequence of (L0, R0)→(L0, R1)→(L0, R0) may cause the avatar to take one step to the right in the virtual world 1050.

While user steps in blocks 1020 and 1040 of FIG. 10 illustrate step sequences wherein the user takes a step of a given length in one of the left or right directions, the user may also control both the size and direction of the avatar's step in any direction. For example, the user may take one big step forward, one small step backward, one medium-sized step diagonally forward to the right, diagonally back to the left, twenty degrees forward and to the right, etc., and the avatar may take a corresponding step in the virtual world. The length of the step that the avatar takes in the real world may be based on the length of the vector between L0 and L1 (if the user executes the left side step sequence) and between R0 and R1 (if the user executes the right side step sequence) in the real world. The direction of the step the avatar takes in the virtual world may be based on the angle of the vector between L0 and L1 or R0 and R1.

In block 1060, instead of taking a step straight to the right, the user moves his or her right foot forward and to the right (e.g., at a diagonal) and takes a step without rotating his or her right foot 1062. Responsively, as illustrated in block 1070, the avatar may move one step of the same distance and in the same direction as the user's right foot moved. In block 1080, the user takes a diagonal step forward and to the right as in block 1060, but the user also rotates his or her right foot slightly to the left 1082. Here, as illustrated in block 1090, the avatar may move in the same distance and direction as in block 1070 but may also rotate its body at the same angle that the user rotated his or her right foot 1082 in block 1080.

The VLC 40 may enter the step mode 910 responsive to the user taking a specific series of actions in the real world as determined by the output of detector 922. In an embodiment, when step detector 922 determines that the user has lifted his or her foot, moved it, planted it, and then lifted it again, with minimal movement of the secondary foot, the VLC 40 state machine may enter the step mode 910. If significant movements occur on the secondary foot, however, the action may be either a gait or turn and may not, therefore, be considered a step by the step detector 922. Minimal movement may be considered to be either not movement at all or a lift-plant transition that occurs over a small time period with minimal change in foot position and orientation. Specific details for these time and distance constraints can be found in FIG. 17.

When a step is detected by step detector 922, a step translation vector and yaw angle orientation change is computed based on the difference in position and orientation of the user's foot at the time of the primary lift and plant. This information along with other step data may be output from the locomotion control logic 58. The animation logic block 800 of the animation controller 60 may use this data to define a translation and rotation of the avatar's body in the virtual world for generating corresponding locomotion animations for the avatar's body. If the animation logic 800 is not using real-time user foot tracking data to control avatar foot position in stance mode 920, it may activate a locomotion animation after the detection of the step has been registered. If the animation logic 800 is using real-time user foot tracking data to control avatar foot position and orientation in stance mode 920, then the avatar foot movement may be initiated to automatically track the user's foot movement between the initial lift and plant events of the primary foot. In this case, the detection of a step may be interpreted by the animation logic 800 to activate a locomotion animation of the avatar to complete the step rather than animating the avatar by tracking the user's foot during the return to its original position.

The VLC 40 of this embodiment may be advantageous over other virtual locomotion systems because it may require the user to initiate an action resembling an actual stepping movement of the desired length and in the desired direction (including planting his or her foot). In addition, unlike other virtual locomotion systems, there is no lag in the detection of the stepping movement as it begins with the detection of the first lift.

Thus, the user is encouraged to make more life like movements in order to control the avatar to make similar movements in the virtual world. This may be particularly useful with training embodiments so that the user may experience the rewards/consequences of making real life movements that the user would be making in the field.

Drive mode 980 may have three sub-modes referred to herein as gait mode 950, auto mode 960 and pivot turn mode 970. Gait mode 950 may allow the user to control the speed and direction of the avatar's locomotion by walking in place. Gait mode 950 may be appropriate, for example, at lower speeds or when fine control of movement is required. Auto mode 960 may allow the user to control the speed and direction of locomotion through foot forces and waist steering yaw rate commands. Auto mode 960 may be more appropriate, for example, at higher speeds or when walking for a prolonged period of time (e.g., when the user gets tired). Pivot turn mode 970 may be accessible from the auto sub-mode 960 and may allow the user to command direction by re-orienting his or her body in the desired direction to provide a discontinuous yaw angle command.

The VLC may enter the gait mode 950 when detector 924 detects the user walking in place for a preset number of steps, taking both feet off the ground during a run, or stepping in the desired direction, then stepping in place with the opposite foot. Once gait mode 950 is entered, a drive speed may be determined according to step frequency, step height, and the fraction of time that both feet are planted on a ground surface. Increasing step frequency, increasing step height, and/or decreasing the fraction of time that both feet are planted may increase the calculated drive speed command. The drive locomotion direction may be determined by the yaw angle between the user's waist and one of the user's feet or the user's waist yaw angle about a vertical axis aligned with the gravity vector in the real world. In the case where gait mode 950 is preceded by a backwards step, the drive direction may be the opposite of what it would have been in a normal case and the avatar may walk backwards. Gait mode 950 may end as determined by gait exit detector 952 if the user's feet are both planted for longer than a calculated maximum timeframe. This timeframe may be updated while the gait mode is active based on a running average of the amount of time both feet are in the plant state while the user performs locomotive movements such as walking, jogging or running. The timeframe will be low if the user has been running and higher if the user has been walking. If gait ends while the user's feet are separated with separation greater than the DriveThreshold and with the drive foot forward, the gait mode may transition directly to auto drive mode 960. Otherwise, control may return to stance mode 920

While in gait mode, if an unusually large foot translation is detected during the course of a lift-plant transition, a "Step Detected" flag may be set in the gait detector. This flag may represent a user taking a large step from within the gait mode and may be implemented in several ways. The step may represent the user's desire to end the gait with a large step in some direction. It may also represent a desire to change direction as a function of step direction to toggle forward and backward or enter a strafing gate. In the current embodiment, this flag also may be ignored.

Figure 11:
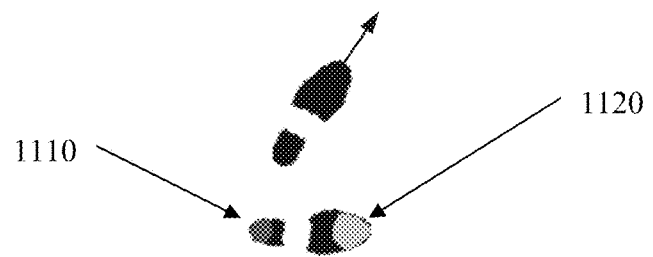
FIG. 11 is a diagram showing the regions where toe and heel foot forces are applied when controlling avatar speed of movement in auto drive mode.

The VLC 40 may enter the auto drive mode 960 from either the stance mode 920 or the gait mode 950 when detectors 928 or 954 detect that the user has taken a step forward and holds that stance such that the user's foot separation is greater than or equal to a predefined threshold. In auto mode 960, the VLC 40 may assume that the user is standing still. Here, locomotion drive speed may be controlled by the user primarily through application of foot forces in the toe 1110 and heel regions 1120 of the user's feet, as shown in FIG. 11.

Using this approach, the harder the user presses down (i.e. the more force applied) on the front of his or her foot (e.g., toes and/or ball of foot) the faster the avatar may move. By pressing down on the back of the user's foot (e.g., his or her heel), the user may generate contact forces that the VLC interprets as braking (or backward movement) commands (e.g., commands that can be used to reduce the forward speed of the avatar). This approach may depend upon the magnitude of the contact forces generated in each region of the foot and may be independent of the orientation of the left or right foot.

In an auto mode embodiment, the difference between the magnitude of the forces applied at the toe and heel may also be used to control forward locomotion speed. An advantage of this type of approach may be that it effectively subtracts out any constant forces (e.g., weight) of the user distributed across the feet. Another approach for controlling forward and backward movements may involve producing speed commands proportional to the distance the center of force on the foot is from the boundary of the heel or toe regions. Since this approach may be independent of the magnitude of the applied foot forces, it may also not be affected by the user's size or weight.

A velocity command generated from device manager 52 can be computed as described previously which is representative of such toe/heel force data. If the velocity command is below a predefined threshold, the avatar may be stopped. Once the command passes the predefined threshold, the avatar speed may increase linearly to a maximum as a function of the velocity command. For low speeds in auto drive mode, the user's waist yaw may directly determine the global direction of movement (i.e. heading yaw angle). Unlike in the gait drive mode, in the auto mode 960, the direction of the avatar's movement also may be controlled by steering rate commands. The direction of movement represented by a steering rate command may be controlled by the relative orientation (e.g., yaw angle) of the user's waist with respect to his or her feet. This type of directional control may enable head movements to be decoupled from body movements, thus allowing the user to freely look around while he or she moves in the direction in which his or her body is currently pointing.

Figure 12:
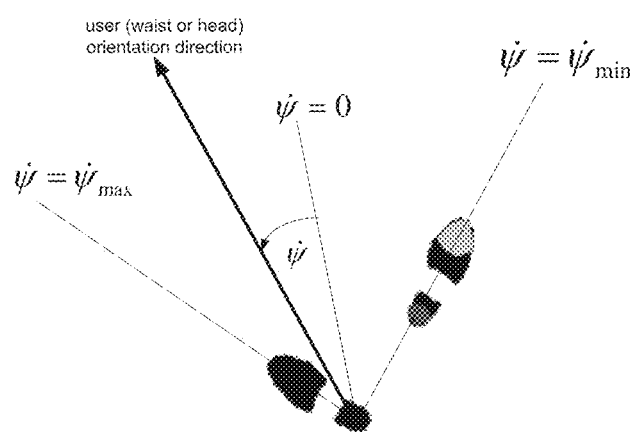
FIG. 12 is a diagram showing how steering rate commands may be generated in an auto drive mode.

FIG. 12 illustrates an example of how steering rate commands may be generated in the auto mode 960. As shown in FIG. 12, the orientation of the user's feet may be used to determine the yaw angles corresponding to zero, minimum (min) and maximum (max) steering rate commands. The zero steering rate command may be associated with an angle that is the midpoint of the angle between the two feet. For example, if the user's feet are positioned so that there is a 90 degree angle between the right and left foot, if the user positions his or her waist at 45 degrees, the avatar continues to move in the same direction the avatar was previously moving in. From there, if the user rotates his or her waist, for example, 10 degrees to the right, the avatar begins changing its direction of movement at a rate proportional to 10 degree offset. The directional rate command ($\dot{\psi}$) computed in this way may be integrated to obtain the direction of travel in which the avatar moves in the virtual environment.

The pivot turn mode 970 may be entered from the auto mode 960 as determined by the output of the gait to drive detector 964. For large, fast turns in a high speed auto drive mode 960, the user may lift his or foot, rotate it and plant it at another angle. Such a lift detected by the pivot detector 964 may cause the user to enter the pivot turn mode 970 and the plant may cause the user to exit back to the auto mode 960. In the pivot mode 970, the drive speed may be constant and the drive rotation may be set directly according to the user's waist yaw.

The locomotion control logic 58 may use information about the current body posture and the force distribution across the toe and heel regions of the feet to determine the style of the resulting locomotion. A reference pose database containing a set of user body poses characteristic of the various styles of locomotion, for example, poses that represent crouched walking, walking while aiming a gun, side stepping, etc., may be used to control the animation style of the avatar. For example, if it is determined that the user's current body pose matches one of these reference poses in the database (e.g., by determining the distance between the joints in the current pose and the reference pose) and the foot forces are consistent with these poses (e.g., as determined by a foot force database), then the locomotion style command may be automatically updated. This may allow the user to perform actions comparable to what they would do in the real world (for example, walk, crouch, sidestep, etc.) and have the system automatically generate animations that reflect this. In addition, the system may automatically generate animation style command changes representing transitions between walking, jogging and running animation based on the speed of the commanded movement.

The jump state 900 may be entered either from the stance mode 920 or the gait mode 950, for example, based on jump detector 930 or gait to jump detector 958 detecting both feet leaving the ground. If the lift times of both feet occur within a predefined timeframe, the jump state may be activated and initialized. The VLC 40 may determine the height of the jump that the avatar performs in the virtual world based on at least one of the acceleration of the user's waist or the forces detected at the user's feet. For example, forward kinematics techniques may be used to animate the legs based on the measured joint angles at the hips, knees and ankles. When the VLC 40 detects that the user has completed his or her jump, the VLC 40 may transition back to either the stance mode 920 or gait mode 950 depending upon which mode was previously active.

Crawl mode 940 may be entered from the stance mode 920 as determined by crawl detector 926. The decision whether to transition to the crawl mode 940 may be based on the height and orientation of the user's waist (e.g., corresponding to a prone position). Lying down may cause all foot and waist pitch values to go beyond a predefined threshold signifying to the system that a crawl has been initialized. Locomotion commands may then be produced by making cyclic movements of one leg representative of a crawling motion, except with no translation of the body (i.e. crawling in place). To move forward, the user may move either foot forward and back in a periodic motion by flexing at the hip and knee. Forward speed may be controlled as a function of the frequency in which the acceleration of the foot, orientation of the upper leg or separation of the feet varies as a function of time. The higher the frequency of movement, the faster the avatar may crawl.

FIGS. 14-21 show different embodiments pertaining to the state detectors described above with respect to FIG. 9. The state detectors may include at least one for each state, including, for example, a step detector, an auto drive detector, a gait drive detector and a pivot drive detector.

FIG. 14 shows a data structure containing state vector information. The locomotion control logic 58 of FIG. 1 may receive information about the movement of the left and right foot and may provide this data structure to each state detector in FIG. 9 during every frame. As illustrated in FIG. 14, time may be the time stamp when sampling the state vector, action may be one of five values, including leftLift (lift on left foot), leftPlant (plant on left foot), rightLift (lift on right foot), rightPlant (plant on right foot), footStill (otherwise). Foot separation may be the separation between the two feet, forward_foot may signify which foot is in front, left_foot and right_foot may store foot information and have 3 fields each: state may be onGround if the foot is on the ground, or offGround otherwise, changing in accordance with action. Position and orientation may store the global position and orientation of the foot.

FIG. 15 shows a data structure for features. The illustrated feature data structure is similar to the state vector data structure illustrated in FIG. 14. However, here, values may be stored in terms of primary foot (pri_foot) and secondary foot (sec_foot) rather than left foot (left_foot) and right foot (right_foot), depending on the value of primary in the detector.

Figure 16:
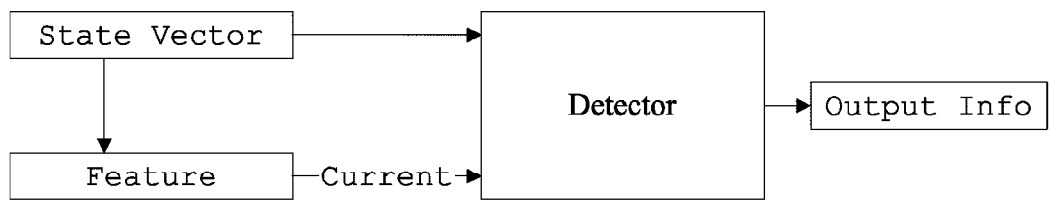
FIG. 16 is a block diagram illustrating a data flow that may be used for each of the detectors in a VLC.

FIG. 16 illustrates an example data flow that may be used for each of the state detectors in finite state machine shown in FIG. 9. Each frame, appropriate state vector information may be loaded into an associated feature data structure (e.g., step feature, gait drive feature, auto drive feature, etc.), and sent into a corresponding locomotion mode detector (step detector, gait drive detector, auto drive detector, etc) for evaluation. If the detector conditions shown as the time and distance constraints in FIGS. 17-21 all evaluate to true for a particular detector, the detector's output is activated and the associated locomotion mode may be changed accordingly.

The events and conditions illustrating step detection are provided in FIG. 17. As the figure shows, the step detector 922 may be looking for a simple lift-plant-lift pattern on the primary (stepping) foot in order to activate step mode 910. The secondary (non-stepping) foot, however, may also exhibit a lift-plant pattern during the course of the primary foot activity because hard steps may often involve some movement of the secondary foot. Time and distance constraints on movement of the primary and secondary feet may be included to ensure more accurate step detection. With respect to time constraints, the step detector may detect a step based on a sequence where the primary foot is lifted (pri_lift1), the primary foot is planted (pri_plant) and the primary foot is lifted again (pri_lift2). For each of the lift, plant and lift actions, the step detector 922 may not detect a step if the action is not performed for an amount of time falling within a range between a defined minimum time and a defined maximum time. This range may be defined such that the pri_plant event must occur after the pri_lift1 time $t_{PL1}$ plus PLminTime and before the pri_lift1 time tPL1 plus PLmaxTime, and the pri_lift2 event must occur after the pri_plant time tPP plus PPminTime and before the pri_plant time $t_{PP}$ plus PPmaxTime. If the secondary foot is lifted for more than a maximum amount of time SLmaxTime, the step detector 922 may not detect that a step has been taken with the primary foot. With respect to distance constraints, the primary foot may be required to lift and move more than a defined minimum distance $d_{minPS}$ but less than a defined maximum distance $d_{maxPS}$ in order for the step detector 922 to register that a step has been taken. If the secondary foot is moved more than a maximum distance $d_{maxSS}$, the step detector 922 may not register a step for the primary foot.

The events and conditions illustrating auto drive detection are provided in FIG. 18. The drive detector 928 may have the same logical structure as the step detector 922. In the case of the drive detector 928, however, the desired pattern may be lift-plant with the primary foot, with the primary planted foot remaining still for a defined minimum amount of time PPmaxTime. As illustrated in FIG. 18, if the primary foot is lifted for more than a defined minimum time PLminTime and less than a defined maximum time PLmaxTime and then the foot is planted for more than a defined minimum time PPmaxTime corresponding to the foot remaining still, the drive detector 928 may detect entry into auto drive mode 960. The drive detector 928 may also determine whether there was any movement of the secondary foot. If there was, it may require that the secondary plant occur at a time $t_{SP}$ prior to the primary foot plant time $t_{PP}$ plus PPmaxTime and before the sec_lift event time $t_{SL}$ plus SLmaxTime. Further, the primary foot may be required to be lifted and moved more than a distance $d_{minPS}$ but less than a distance dmaxPS from its starting position. It may also be required to move to a defined region with respect to the secondary foot in order for the detector to detect that auto drive mode 960 should be activated. This may be accomplished by determining whether the foot separation after the primary plant is larger than a preset threshold $d_{FootSep}$ and whether the forward foot is the predefined primary foot. The secondary foot may also be required to move less than a maximum distance $d_{maxSS}$ from its starting position. If these conditions are met, the drive detector 928 may detect a drive command and activate auto drive mode 960.

Figure 20:
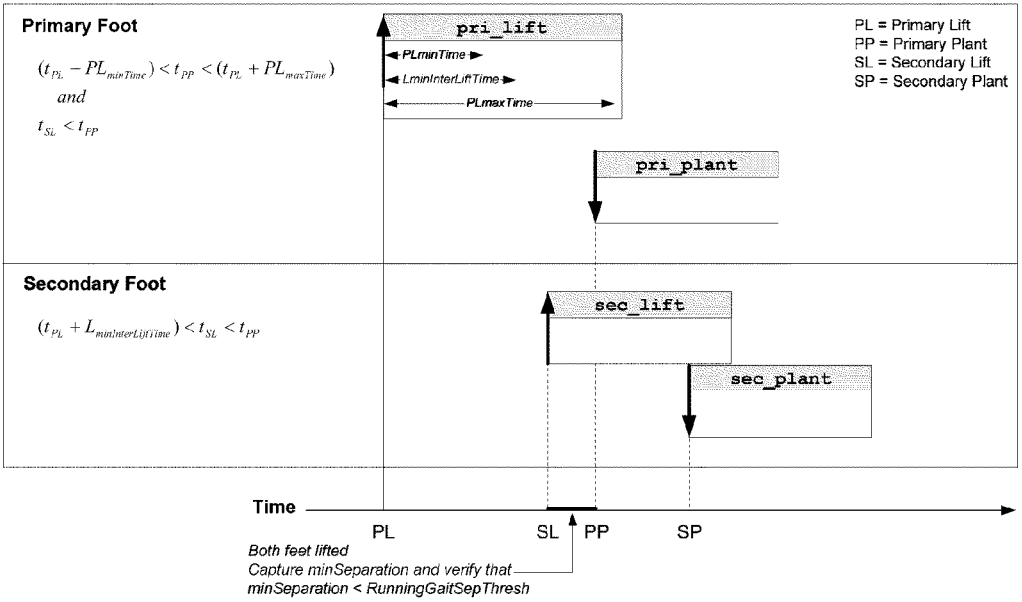
FIG. 20 illustrates the time and distance events and conditions used to detect the step pattern for a second scheme of gait drive mode.

The gait detector 924 may look for three distinct stepping patterns represented by FIG. 19, FIG. 20 and FIG. 21 for entry into gait drive mode 950. In a first scheme represented by FIG. 19, the detector may look for a defined number of lifts on alternating feet with each lift occurring before the time of the previous lift event plus LmaxGaitTime as a condition to activate gait drive mode 950. The gait detector 924 may not require detection of a plant after each lift. If a plant is detected, however, it may also require that the position of the foot on planting be within a set distance $d_{minPS}$ or $d_{minSS}$ of its position on lifting. It may also require that a plant occur within a set timeframe from the previous lift on the same foot, between the last pri_lift time plus PLminTime and the last pri_lift time plus PLmaxTime in the case of the primary foot and between the last sec_lift time plus SLminTime and the last sec_lift time plus SLmaxTime in the case of the secondary foot. This may prevent a step command from being interpreted as part of an attempt to enter gait drive mode 950. These requirements may allow the user to activate the gait drive mode 950 by walking in place with a predefined number of lifts.

In a second gait detection scheme represented by FIG. 20, the detector may look for lifts on both feet before either one plants with a significant time offset between them as a condition to activate gait drive mode 950. This significant time offset may be defined such that the time of the sec_lift event $t_{SL}$ may be after the time of the pri_lift event $T_{PL}$ plus LminInterLiftTime. This pattern may occur if the user starts running or if the user takes a very powerful step involving secondary foot lift. In order to differentiate between a run and a powerful step, a minimum foot separation minSeparation may be recorded while both feet are in the air. The gait detector 924 may require that this separation be lower than a set threshold RunningGaitSepThresh for gait detection. The gait detector 924 may also require that the plant event pri_plant for the primary foot occur within a predefined time frame of the primary lift event pri_lift. This timeframe may be defined as being between the time of the pri_lift event $t_{PL}$ plus PLminTime and the time of the pri_lift event $t_{PL}$ plus PLmaxTime. The detector may also require that the pri_plant event occur before the sec_plant event. These requirements may allow the user to activate the gait drive mode 950 by lifting both feet while running in place.

In a third gait detection scheme represented by FIG. 21, the gait detector 924 may look at the latest reported step from either the step detector 922 or the drive exit detector 962 (See step detector 922 and drive exit detector 962 descriptions in FIG. 13). If a lift-plant pattern is recorded on the foot that was secondary in the step, with that pattern starting after the step ends and the primary foot plants, and subject to certain constraints, a gait drive command may be detected. These constraints may include secondary foot translation less than a set threshold $d_{minSS}$ and the sec_lift event occurring after the primary return_plant event time $t_{RP}$ and before the primary return_plant event time $t_{RP}$ plus PPgaitMaxTime. The gait detector 924 may also require that the sec_plant event occur after the sec_lift event time $t_{SL}$ plus SLminTime and before the sec_lift event time $t_{SL}$ plus SLmaxTime. It may further require that the translation of the primary foot from the time of step detection to the return_plant $d_{ReturnStep}$ be greater than dminSS and less than $d_{maxSS}$. These requirements may allow the gait detector 924 to activate the gait drive mode 950 when the user steps in the direction of desired motion and then simply takes a single step in place. In this way, the user may be able to activate avatar movement through a normal step command and then cause this movement to continue by walking in place. This may also allow a user operating in auto drive mode 960 to continue the forward autodrive motion by exiting from autodrive and walking in place to activate gait drive mode 950. It should be noted that some of the parameters shown in FIGS. 17-21 may not have the same value in different modes.

Figure 22:
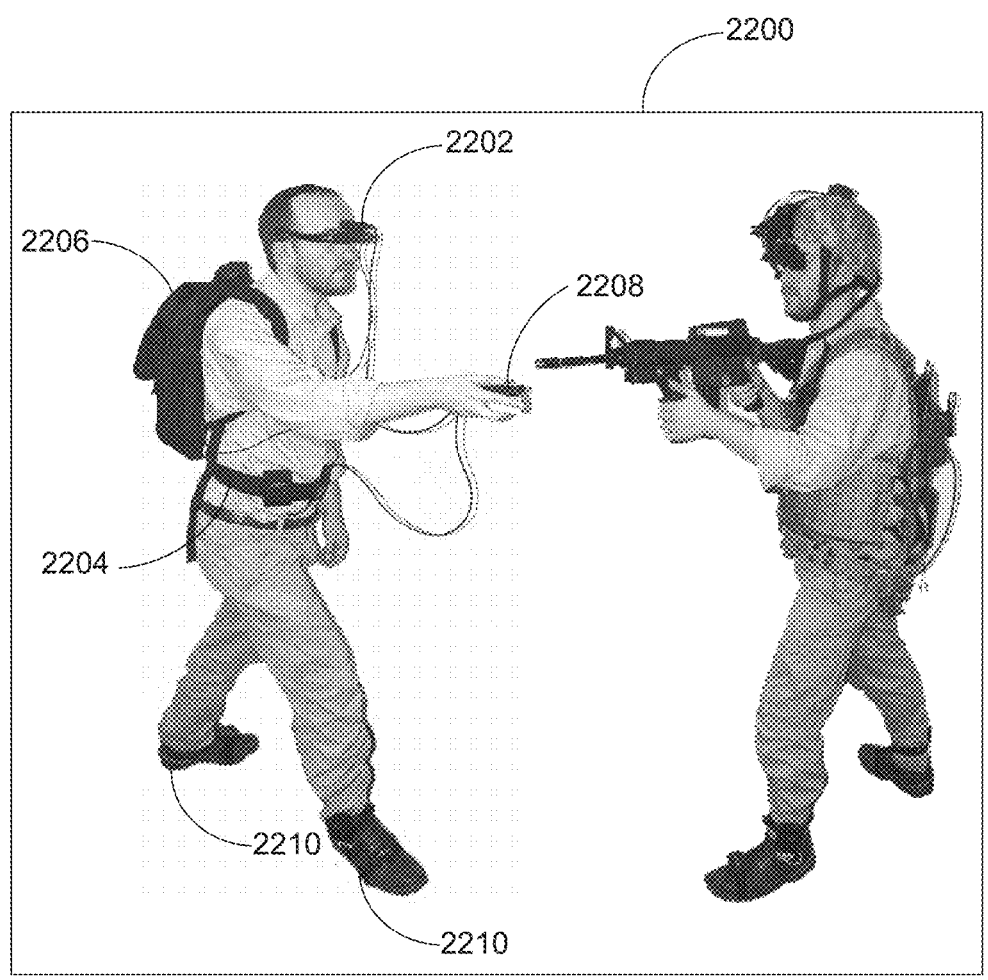
FIG. 22 is a diagram illustrating a self-contained user-wearable apparatus including a virtual locomotion controller user interface, computer, head mounted display (HMD) and handheld controller or weapon.

FIG. 22 illustrates an embodiment of the present invention wherein the body tracking unit 20 comprises a self-referencing body racking system, the VLC 40 and the display are all included within a self-contained user-wearable apparatus 2200. The illustrated apparatus 2200 includes a pair of glasses 2202, which may act as a head-mounted display (HMD) on which the user may view the virtual world, a back pack 2206, which may include the VLC 40, a processor for storing and processing the simulation/game application and optionally one or more of the sensor interface electronics 30, a belt 2204, which may include one or more sensors disposed at the waist location and optionally the associated interface electronics 30, a hand-held remote control 2208, which may include the one or more sensors and interface electronics for the hand location, and overshoes 2210, which may be worn of the user's shoes and include the one or more sensors for the foot locations.

FIG. 23 shows a detailed view of an embodiment of the overshoes 2210, including the location of the ultrasonic sensors 2330, inertial sensors 2320 (and optionally in or on the interface electronics module 2310), toe force sensor 2340, heel force sensor 2350 and interface electronics module 2310. Straps 2360 are also shown that allow the interface electronics to be attached at the ankle. In this and embodiment, such overshoes combined with an inertial sensor and interface electronics attached at the waist comprise the self referencing body tracking system.

Because all of the components the user may need to operate a VR simulation and/or game may be worn by the user in the embodiment shown, the apparatus may be considered to be self contained and, as such, may allow the user more portability and flexibility with respect to the environment in which he or she may carry out a VR simulation and/or play a VR game.

VLC user interfaces and systems as described herein may be suitable for use in many different applications, including simulation programs for training (e.g., military training), video game applications and exergaming applications. The fact that physical movement is an important component of the man/machine user interface provided by the present invention leads to a number of gaming and interactive fitness applications in which physical speed, agility, endurance and other forms of physical exertion and exercise become an important part of the game play.

In a simulation application, the simulation program may simulate a training environment for a user. For example, in a military training application, the user may control movements and actions of an avatar in a virtual combat situation. Because the VLC described herein requires the user to make natural and life-like movements in order to control the avatar, this can provide a number of benefits. For example, the user may effectively learn the consequences of his or actions in a combat situation without being subject to actual harm, different combat scenarios can be used to enhance the user's situational awareness and tactical decision making skills, and the physical activity associated with use of the VLC can introduce a fatigue factor into the decision making processes required by the virtual training experience.

Standalone gaming and virtual sports applications involving the VLC may include active adventure games (especially those containing sword fighting), or racquet-based games similar to tennis, racquetball or squash. In such a video game application, the VLC described herein may allow the user to have a more life-like video gaming experience. For example, in a standalone tennis application, the VLC may be able to detect more than just the timing of the user's swing. It may also detect, for example, the orientation and acceleration of the user's racquet as well as the speed and direction of the user's locomotive movements (such as walking or running in place). Thus, the game may be more life-like, because, in addition to controlling the timing with which the avatar swings at the virtual tennis ball, the user may also control racquet placement, the force of the swing and the avatar's locomotive movements which are intended to move the user's avatar toward the virtual ball.

In addition, the present invention enables user performance on common exercise equipment (e.g. stationary bike, treadmill, stair steppers, rowing machine, cross country skiing, elliptical, etc) to control an avatar in a game, simulation or virtual training application. Furthermore, the invention of the present system does not require such exercise equipment to be modified or retrofitted in order for the user to interact with such games or applications. This capability of the VLC allows the user to take advantage of exercise equipment already in the home or at a health club or fitness center. In addition, when at home, users can network into games being played at the club in a similar manner. As a result, the invention of the present system can make exercise a means to and end, instead of an end in itself. Immersion in the user experience can mask the negative aspects of exercise, while the tracking of human body provided by the body tracking unit 20 can be used to evaluate user performance. For example, an embodiment of the present invention could track user calorie burn during each exercise session and plot/chart the results.

In an exergaming application, the user may wear a self-contained apparatus including the VLC, the sensors, the interface electronics and an optional display (e.g., the apparatus 2200 of FIG. 22) and use the VLC in conjunction with a piece of exercise equipment. For example, the user may choose to use the VLC while riding a stationary bicycle. As the user rides the bicycle, the user's foot movements and upper body lean angle (i.e. roll angle at the user's waist), as determined by the body tracking unit 20, may be used to control the speed and direction of an avatar in a game application shown on the display. For example, the avatar may be a car in racing game application. Because the apparatus of the present invention is self-contained, the user may easily switch to another piece of equipment, for example an elliptical machine, and continue playing the exergame on the new piece of equipment without any modifications to the exercise equipment or game required. In another embodiment the user wears the body tracking section 20 which is connected through a wireless link to the VLC 40 implemented on a notebook computer placed on the exercise equipment. In another embodiment of the present invention intended for applications involving exercise equipment, the inertial sensors initially consist of only accelerometers to reduce cost. However, due to the modular design of the body tracking unit 20 the inertial sensors can be easily upgraded to include orientation sensing capabilities without any other changes to the hardware required.

Figure 24:
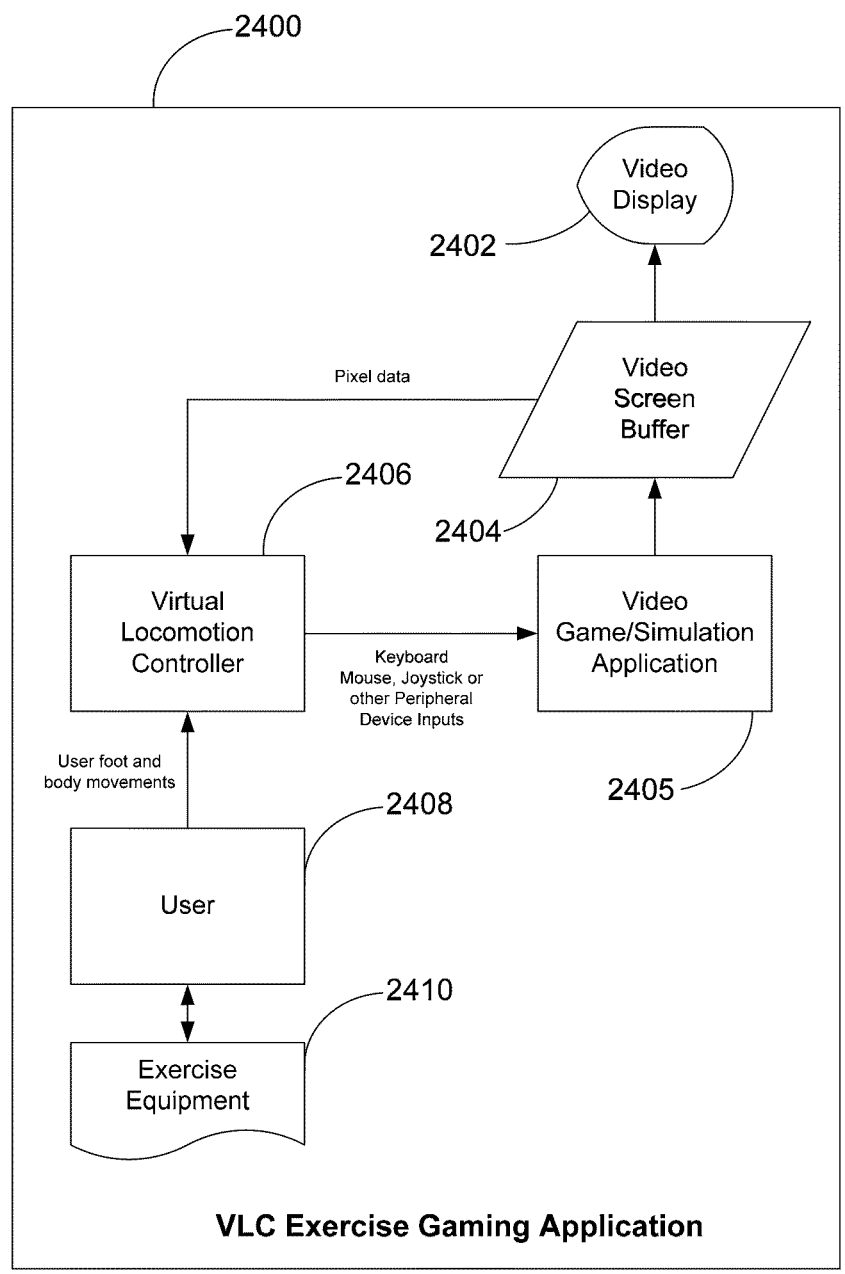
FIG. 24 is a block diagram illustrating an apparatus that may be used in an exergaming application and its interaction with a user on a piece of exercise equipment.

FIG. 24 is a block diagram illustrating an apparatus that may be used in an exergaming application and its interaction with a user 2408 on a piece of exercise equipment 2410. The illustrated apparatus includes a video display 2402, a video screen buffer 2304, a video game/simulation application 2405 and a VLC 2406. As shown, when the user moves to operate the exercise equipment 2410, the user's foot and body movements may be detected and transmitted to the VLC 2406. The VLC 2406 also receives pixel data from the video screen buffer 2404, which is coupled to the video display 2402. The VLC 2406 may use the user foot and body movements and the pixel data to generate and provide to the video game/simulation application 2305 keyboard, mouse, joystick of other peripheral device inputs. The video game/simulation application 2403 may use the inputs to control the movement of the avatar or character on the video display 2402 via the video screen buffer 2404.

Although the features and elements of the present invention are described in the preferred embodiments in particular combinations, each feature or element can be used alone without the other features and elements of the preferred embodiments or in various combinations with or without other features and elements of the present invention.

What is claimed:

1. A user interface system, comprising:
   a body tracking unit configured to provide information about movement of a user including movement of a primary foot and a secondary foot; and
   a control unit configured to:
   receive the information from the body tracking unit,
   determine whether the movement of the primary foot of the user includes a first set of event sequences corresponding to at least a first lift event, a first plant event, and a second lift event that conform to a first set of time and distance constraints, and
   determine whether the movement of the secondary foot of the user includes a second set of event sequences corresponding to a first lift event and a first plant event that conform to a second set of time and distance constraints wherein the first set of time and distance constraints for the primary foot includes minimum and maximum timing and distance constraints, and the second set of time and distance constraints for the secondary foot includes maximum timing and distance constraints, and
   generate a control signal only in response to detection of said second lift event of the primary foot if the control unit determines that the movement of the primary foot includes said first set of event sequences that conform to the first set of time and distance constraints and any movement of the secondary foot conforms to the second set of time and distance constraints, wherein the control signal controls an avatar to make a step movement in a virtual world.

2. The system of claim 1, wherein the body tracking unit is configured to be worn by the user.

3. The system of claim 2, wherein the body tracking unit is self-referencing.

4. The system of claim 3, wherein the system is configured for use in at least one of a standalone manner and in conjunction with exercise equipment.

5. The system of claim 2, wherein the system is configured for use as an input device for computer game or virtual reality training applications.

6. The system of claim 1, wherein:
   the control unit is further configured to:
   determine an orientation of at least the primary foot of the user, and
   based at least on the determined orientation, control a direction of movement of an avatar in the virtual world.

7. The system of claim 6, wherein the control unit is further configured to:
determine an orientation of at least the waist of the user, and
based at least on the determined waist orientation, control the avatar body orientation independent of the avatar direction of movement.

8. The system of claim 1, wherein the control unit is further configured to distinguish between the stepping movement of the user and body movements of the user that are not associated with stepping.

9. The system of claim 8, wherein the control unit is further configured to distinguish between the stepping movement and at least one of a walking movement, a running movement, a jumping movement and a crawling movement.

10. The system of claim 1, wherein the control unit is configured to be worn by the user.

11. The system of claim 1, wherein the body tracking unit comprises a plurality of sensors, the sensors being configured to measure the movement of the user.

12. The system of claim 1, wherein the avatar is one of a character, a vehicle, or any other animated object in the virtual world.

13. The system of claim 1, wherein:
the movement of the user includes a stepping movement with the primary foot of a particular length and in a particular direction; and
the control signal is configured to control a magnitude and a direction of translation of the avatar in the virtual world based at least on the stepping movement with the primary foot of the particular length and in the particular direction.

14. The system of claim 1, wherein each of the first set of time and distance constraints and the second set of time and distance constraints includes at least one of a minimum lift time, a maximum lift time, a minimum plant time, a maximum plant time and a minimum distance.

15. The system of claim 1, wherein the control unit is further configured to detect at least a stepping mode of operation, wherein the control unit determines that the stepping movement with the primary foot includes a specified sequence of lift and plant events and the movement with the secondary foot conforms to at least one constraint, and a stance mode of operation, wherein the control unit does not detect movement by the primary foot and the secondary foot that conforms to at least one constraint.

16. A method of controlling a character in a virtual environment, the method comprising:
receiving information about a movement of a user including movement of a primary foot and a secondary foot;
determining whether the movement of the primary foot of the user includes a first set of event sequences corresponding to at least a first lift event, a first plant event, and a second lift event that conform to a first set of time and distance constraints, and
determining whether the movement of the secondary foot of the user includes a second set of event sequences corresponding to a first lift event and a first plant event that conform to a second set of time and distance constraints, wherein the first set of time and distance constraints for the primary foot includes minimum and maximum timing and distance constraints, and the second set of time and distance constraints for the secondary foot includes maximum timing and distance constraints, and
generating a control signal only in response to detection of said second lift event of the primary foot if the control unit determines that the movement of the primary foot includes said first set of event sequences that conform to the first set of time and distance constraints and any movement of the secondary foot conforms to the second set of time and distance constraints, wherein the control signal controls an avatar to make a step movement in the virtual environment.

17. The system of claim 16, wherein the control signal is configured to control an avatar to move in a virtual environment.

18. The system of claim 17, wherein:
the movement of the user includes a stepping movement with the primary foot of a particular length and in a particular direction, and
the control signal is configured to control a magnitude and a direction of the translation of the avatar in the virtual environment based at least on the stepping movement with the primary foot of the particular length and in the particular direction.

19. The method of claim 16, further comprising:
determining an orientation of at least the primary foot of the user; and
based at least one the determined position, controlling a direction of movement of an avatar in a virtual environment.

20. The method of claim 19, further comprising:
determining an orientation of at least the waist of the user, and
based at least on the determined waist orientation, controlling the avatar body orientation independent of the avatar direction of movement.

21. The method of claim 16, wherein the avatar is one of a character, a vehicle, or any other animated object in the virtual environment.

22. The method of claim 16, wherein each of the first set of time and distance constraints and the second set of time and distance constraints includes at least one of a minimum lift time, a maximum lift time, a minimum plant time, a maximum plant time and a minimum distance.

23. A virtual locomotion controller (VLC) comprising:
a receiving unit configured to receive information about a movement of a user including movement of a primary foot and a secondary foot;
a processing unit configured to:
determine whether the movement of the primary foot of the user includes a first set of event sequences corresponding to a first lift event, a first plant event, and a second lift event that conform to a first set of time and distance constraints, and
determine whether the movement of the secondary foot of the user includes a second set of event sequences corresponding to a first lift event and a first plant event that conform to a second set of time and distance constraints, wherein the first set of time and distance constraints for the primary foot includes minimum and maximum timing and distance constraints, and the second set of time and distance constraints for the secondary foot includes maximum timing and distance constraints, and
a signal generating unit configured to generate a control signal configured to control an avatar to make a step movement in a virtual environment, wherein the control signal is generated only in response to detection of said second lift event of the primary foot if the control unit determines that the movement of the primary foot includes said first set of event sequences that conform to the first set of time and distance constraints and any movement of the secondary foot conforms to the second set of time and distance constraints.

24. The VLC of claim 23, wherein the avatar is one of a character, a vehicle, or any other animated object in the virtual environment.

25. The VLC of claim 24, wherein:
the movement of the user includes a stepping movement with the primary foot of a particular length and in a particular direction, and
the control signal is configured to control a magnitude and direction of the translation of the avatar in the virtual environment based at least on the stepping movement with the primary foot of the particular length and in the particular direction.

26. The VLC of claim 23, wherein:
the processing unit is further configured to determine an orientation of at least the primary foot of the user, and
the control signal is further configured to control a direction of movement of the avatar in the virtual environment based at least on the determined orientation.

27. The VLC of claim 26, wherein the processing unit is further configured to:
determine an orientation of at least the waist of the user, and
based at least on the determined waist orientation, control the avatar body orientation independent of the avatar direction of movement.

28. The VLC of claim 23, wherein the processing unit is further configured to distinguish between the stepping movement of the user and body movements of the user that are not associated with stepping.

29. The VLC of claim 28, wherein the processing unit is further configured to distinguish between the stepping movement and at least one of a walking movement, a running movement, a jumping movement and a crawling movement.

30. The VLC of claim 23, wherein each of the first set of time and distance constraints and the second set of time and distance constraints includes at least one of a minimum lift time, a maximum lift time, a minimum plant time, a maximum plant time and a minimum distance.

31. The VLC of claim 23, wherein the processing unit is further configured to detect at least a stepping mode of operation, wherein the processing unit determines that the movement with the primary foot includes a specified sequence of lift and plant events and the movement with the secondary foot conforms to at least one constraint, and a stance mode of operation, wherein the processing unit does not detect movement by the primary foot and the secondary foot that conforms to at least one constraint.

* * * * *